United States Patent [19]
Mankovitz

[11] Patent Number: 5,465,240
[45] Date of Patent: Nov. 7, 1995

[54] APPARATUS AND METHODS FOR DISPLAYING TEXT IN CONJUNCTION WITH RECORDED AUDIO PROGRAMS

[76] Inventor: Roy J. Mankovitz, 18057 Medley Dr., Encino, Calif. 91316

[21] Appl. No.: 1,117

[22] Filed: Jan. 5, 1993

[51] Int. Cl.[6] ............................................. H04B 1/20
[52] U.S. Cl. ....................... 369/1; 369/4; 360/72.2; 360/48
[58] Field of Search .................... 369/1, 4, 2, 3; 360/60, 72.2, 79, 19.1, 18, 48, 49, 50, 27, 74.4, 39, 55; 84/609, 601, 625, 634

[56] References Cited

U.S. PATENT DOCUMENTS

| | | | |
|---|---|---|---|
| 3,913,135 | 10/1975 | Damlamian | 360/79 |
| 4,377,825 | 3/1983 | Kasubuchi et al. | 360/48 |
| 4,426,684 | 1/1984 | Sechet et al. | 364/900 |
| 4,445,150 | 4/1984 | Nakajima et al. | 360/18 |
| 4,630,143 | 12/1986 | Juso et al. | 360/72.2 |
| 4,684,349 | 8/1987 | Ferguson et al. | 434/308 |
| 4,690,645 | 9/1987 | Ukisu | 434/309 |
| 4,797,750 | 1/1989 | Karweit | 358/335 |
| 4,870,515 | 9/1989 | Stokes | 360/72.2 |
| 4,968,254 | 11/1990 | Gangwere, Jr., et al. | 434/118 |
| 5,243,123 | 9/1993 | Chaya | 84/609 |

FOREIGN PATENT DOCUMENTS 0066382  4/1985  Japan.

Primary Examiner—Ali Neyzari
Attorney, Agent, or Firm—Christie, Parker & Hale

[57] ABSTRACT

A lyrics adapter allows a standard cassette player to play tapes for karaoke that contain the lyrics to the music and timing data associated therewith that are recorded as audio tones on the tape. The adapter detects silent periods greater than a predetermined length on the audio signals from the cassette player and converts the subsequent audio tones into a digital signal. When an end of message (EOM) code is detected, the adapter connects the audio signals containing music to external speakers. As the music plays, a central processing unit (CPU) calculates the elapsed time from the EOM code and transfers the data corresponding to the lyrics that are to be displayed at that time thereby displaying the lyrics in real time and in synchronization with the music as it is being played.

37 Claims, 21 Drawing Sheets

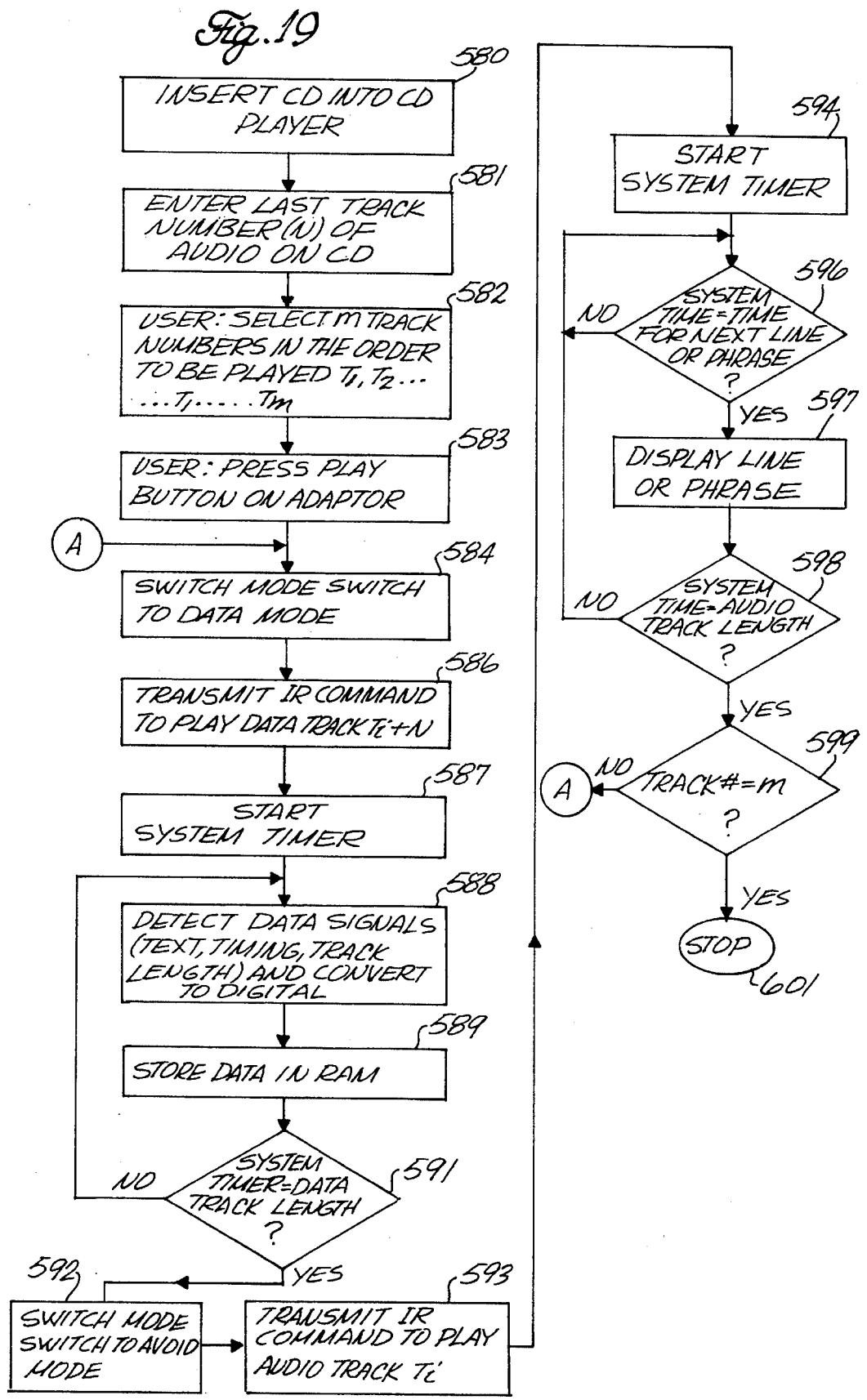

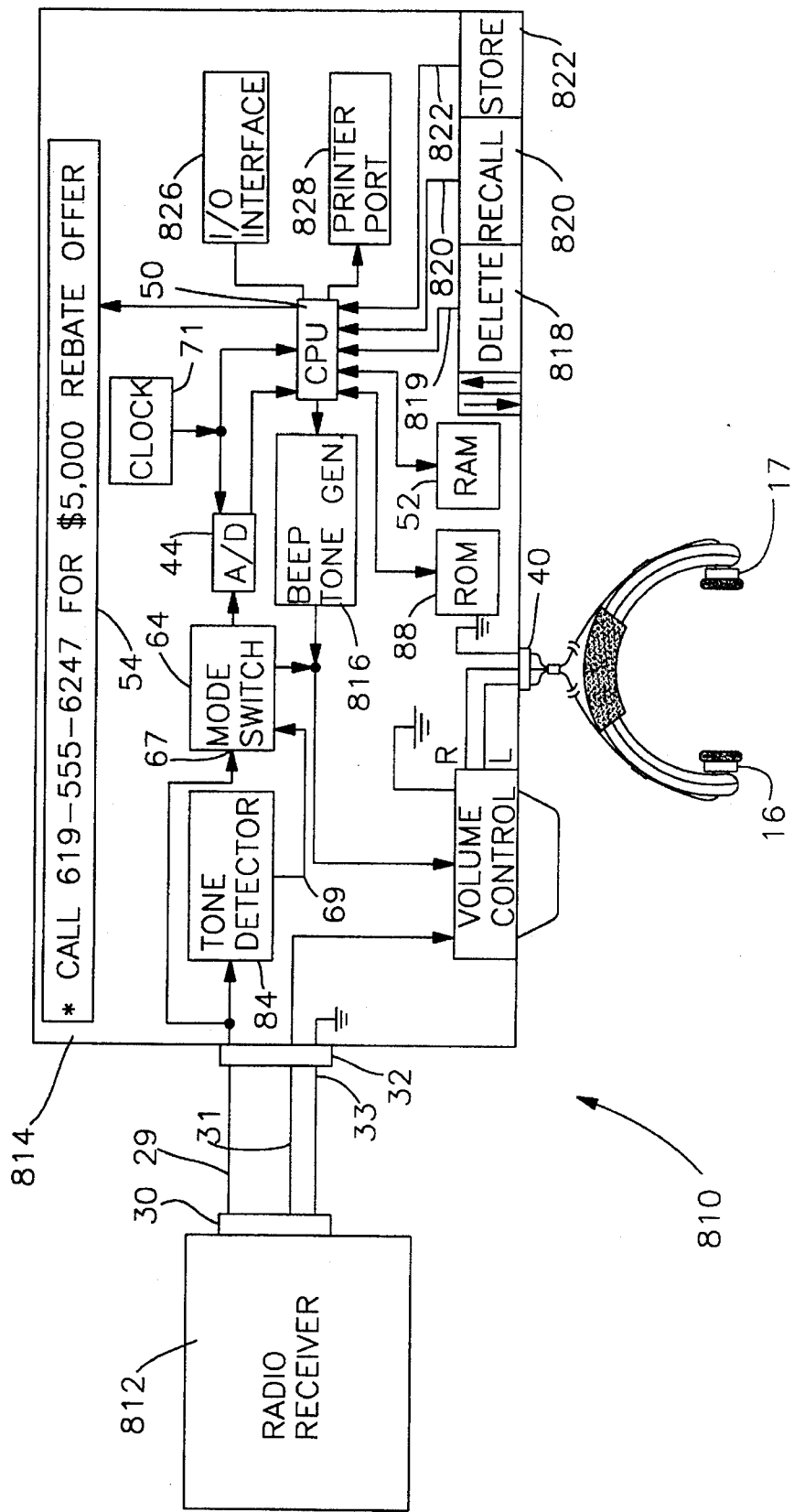

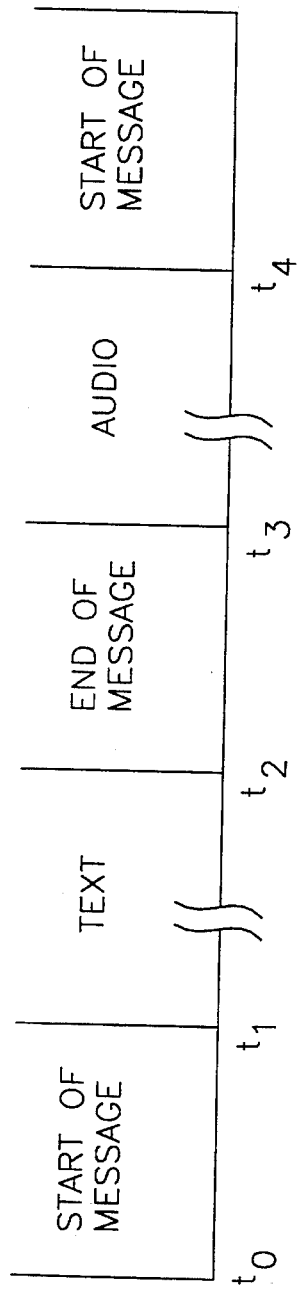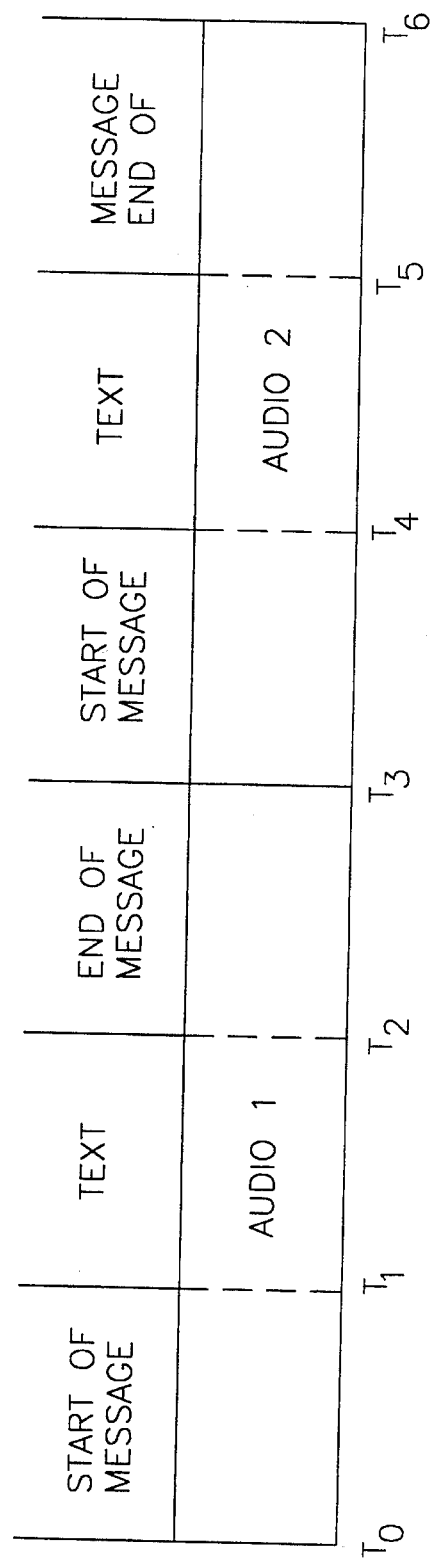

APPARATUS AND METHODS FOR DISPLAYING TEXT IN CONJUNCTION WITH RECORDED AUDIO PROGRAMS

FIELD OF THE INVENTION

This invention relates to the recording, reading and display of text information in conjunction with audio program selections and, more particularly, to the recording, reading and display of text information in conjunction with audio program selections using existing audio tape cassette and compact disk recording formats, as well as existing audio tape cassette and compact disk players.

BACKGROUND OF THE INVENTION

A wide variety of systems have been developed for the recording and playback of text and audio, intermixed on the same recording media. For the most part, these systems have involved the use of playback equipment that is modified in design from the widely disseminated consumer audio tape cassette and compact disk (CD) players. Hence, in order for a consumer to make use of these prior art systems, new player equipment must be purchased, along with specially recorded media which is generally not compatible with the consumer's existing equipment.

There are several consumer electronics applications for recorded media in which text is intermixed with audio selections. One such application is karaoke, where the user sings the lyrics of a song in synchronism with an audio orchestration of the song. A second such application is referred to as "sing-along," where the user sings the lyrics of a song along with a pre-recorded vocal arrangement. In both the karaoke and sing-along applications, it is desirable to display the song lyrics in synchronism with the orchestral or vocal arrangement.

Another application is in programs for learning a foreign language, and in language translators. In such programs, it is desirable to display the text representation of a foreign language word or phrase, while the user listens to the audio pronunciation of that word or phrase in the foreign language. Yet another application is to identify in text form identifying information relating to a musical selection, such as the name of the selection, the artist name, composer, album name, etc. Still another application relates to radio broadcasts, where it is desirable to display to a user in text form information which supplements audio advertisements and editorials.

Many existing video systems presently provide karaoke and sing-along, where the lyrics to the song being played are recorded on, for example, video tape. The lyrics are recorded on the video portion of the video tape in a manner similar to the recording of other video images. The lyrics may be superimposed over a television image of the performers of the music, such as a music video, or over other artistic video creations. Similarly, video disks may contain karaoke and sing-along lyrics. As with video tape, the lyrics may be recorded along with other video information. Video disks, also referred to as laser disks (LD), store the lyrics and other video information digitally.

Another system has been developed for using standard audio tape players, such as standard cassette tape recorders, in conjunction with specially recorded audio tape to assist the user in karaoke and sing-along. In the way of background, consumer magnetic audio tape is divided into two longitudinal regions on the tape. One region of the tape is for recording and playing music when the tape is moving in one direction and the other region is for recording or playing music when the tape is moving in the opposite direction. In stereo systems, each region is divided into two spaced-apart longitudinal tracks for recording music for the left and right channels of a stereo recording. The special audio tapes for karaoke and sing-along applications have orchestral arrangements of a song recorded in the left channel and accompanying vocals in the right channel. The singer may either sing along with the singer recorded on the tape or sing solo by playing (using a balance control) only the music recorded on the left channel. Alternatively, the vocals may be provided to headphones so that only the singer hears the vocals, which allows the singer to be able to sing along with the recorded vocals without the audience hearing them. The singer reads the lyrics from printed text provided with the tapes.

Another prior art system for use in karaoke applications is known as CD+G (CD plus graphics). In this system, a special CD player must be purchased, along with special CD+G disks. The CD+G disks have encoded thereon in digital form the lyrics which accompany orchestral arrangements which are also encoded on the disk. The special player separately decodes the lyric data, converts it into a standard NTSC television video signal, and provides it to a video output connector. The audio data on the disk is provided to conventional stereo audio output connectors. In use, the video output signal is provided to the video input terminal of a television receiver, and the audio output signals are provided to headphones or a stereo audio system. When the CD+G disk is played, the audio orchestration of the song is heard, and the lyrics appear on the television screen in synchronism therewith.

For radio broadcast applications in which text is intermixed with audio programs, a system known as RDS (radio data system) has been developed, and is in widespread use in Europe. In this system, special FM receivers are required to receive an FM subcarrier signal carrying a digital representation of broadcast text messages, which are displayed on a receiver display. Special subcarrier equipment is required at the broadcast station to accomplish this function. No known comparable system exists for use with AM broadcasts.

While AM and FM broadcast station program materials generally consist of a combination of music, news, advertising, and information programs, the interest of a large segment of the listening audience is directed to the music portion of the broadcasts. In fact, the music industry cooperates with the radio stations and encourages the broadcast of the latest album releases on the basis that most album sales are the result of audience reaction to broadcast musical selections.

One of the more frustrating aspects confronting the listener concerns deciphering the lyrics of music selections received on the radio. Often the lyrics of vocal music, from modern popular music to classical music, are difficult to understand, even after the selection is heard many times. It is sometimes possible for a listener to obtain lyrics by buying the compact disc (CD) on which the selection is included. However, many compact discs do not include printed lyrics and the listener has no way to know before buying the CD whether lyrics are included. Further, the listener must buy the whole CD on which the selection is included just to get the lyrics of the one desired selection.

Even if printed lyrics are obtained by the listener, the printed lyrics do not indicate when the individual words are sung in relation to the music contained on the CD. One way of solving this problem are the video sing-along systems and "karaoke" systems described above. However, these self-contained systems reproduce musical selections, often with the lead vocal omitted and display lyrics on video screens. In addition, these systems involve expensive equipment and require the additional purchase of special recordings of musical selection that often can be only used with the sing-along systems.

Another source of frustration is the identification of the broadcast musical selections, particularly since the stations do not employ a uniform method of identification. Some stations announce the titles of a group of selections prior to their broadcast, others announce the titles after the broadcast of such a group, while still others provide such announcements on a random basis. Rarely do the stations announce the title, artist and album information for each selection. The result is that the listener is generally unable to rapidly identify and remember a particular musical selection with sufficient accuracy to enable the subsequent purchase of the album containing that selection.

SUMMARY OF THE INVENTION

Briefly, the invention includes apparatus in the form of an adaptor that selectively connects the audio output signal of a cassette tape player, CD player, radio receiver, or other audio source to a sound transducer and to a display, respectively, in response to a first and second type of audio signal. The first type signal is in the form of conventional audio signals that contain voice/music audio information. The second type signal is in the form of text information encoded as audio tones, where the text information generally relates to the audio information which follows. The apparatus is designed to be used with conventional monaural and stereo audio tape cassette players, CD players, AM and FM radio, and TV receivers. The adaptor comprises analyzer means for analyzing incoming audio signals provided from the audio source, and for generating an electrical signal representative of the type of audio signal received; processing means for processing the second type signal to generate text display information encoded in the second type signal; sound transducer means for generating sound in response to the first type signal; switching means for providing the incoming audio signal to either the processing means in response to detecting the second type signal, or to the sound transducer means in response to the detection of the first type signal; and means for displaying the display information.

The invention also includes a method for selectively providing incoming audio signals from an audio source to either a sound transducer or to a signal decoder and display, comprising the steps of:

detecting a first control signal from the incoming audio signals, indicative of the start of receipt of text data;

providing, in response to detection of the first control signal, the incoming audio signals to a signal decoding circuit;

decoding the incoming audio signals following the first control signal into digital signals;

detecting a second control signal from the incoming audio signals, indicative of the end of receipt of text data;

providing, in response to detection of the second control signal, the incoming audio signals to the sound transducer for producing a voice or music; and displaying at least a portion of the digital signals as text data.

An adaptor is provided which is compatible with conventional AM and FM receivers which receive as radio signals audio musical selections and auxiliary data in the form of a digital message signal representing a text message which includes the name of the musical selection, name of the artist performing the selection, the name of the album on which the selection is located, the lyrics of the musical selection and timing data for synchronizing the lyrics with the music. The text message as audio tones is transmitted either during, immediately prior to or immediately after the transmission of the musical selection. The musical selection is reproduced using loudspeakers and the like, and the message signal is decoded into the text messages which are displayed on a display substantially concurrent with the reproduction of the musical selection.

A user operated storage feature is provided for storing the displayed text message, and for recalling it for display at a later time. In another embodiment, the storage feature also stores a portion of the musical selection along with the text message identifying that selection. Upon recall, the stored musical selection is reproduced while the stored message is displayed. Multiple text messages and corresponding musical selections may be stored and recalled by user operation of the control switches.

Also disclosed is a method of identifying audio broadcast programs, including the steps of: providing an audio musical selection; providing a text message signal representing a text message which includes the name of the musical section and the name of the artist performing the selection; transmitting the text message signal as audio tones and the audio musical program, where the text message signal is transmitted substantially concurrent with the transmission of the audio musical selection; receiving the audio musical selection and the text message signal; decoding the text message signal into the text message; reproducing the audio selection using audio transducer means; and displaying the text message substantially concurrent with the reproduction of the musical selection.

A system for storing, broadcasting, receiving and displaying lyrics of music substantially simultaneously with the broadcast of the audio music itself is also disclosed. Phrases of lyrics are broadcast and received prior to, and displayed in synchronization with the accompanying music. Further, once a phrase is displayed, individual words or lines of the phrase may be highlighted as the particular word or line occurs in the accompanying music.

The system also provides for preparing, broadcasting, receiving and displaying supplemental text provided by advertisers. The supplemental advertising text is broadcast and displayed substantially simultaneously with the broadcast of a corresponding audio commercial message. This supplemental advertising text can be output to a printer or stored in memory by a user for later reference.

These and other aspects of the invention will be fully understood by referring to the following detailed description and the accompanying drawings.

BRIEF DESCRIPTION OF THE DRAWINGS

FIG. 19 is a flow chart showing the steps employed in the operation of the adaptor in FIG. 18;

FIG. 20 is a functional block diagram showing an adaptor constructed in accordance with the present invention for use with a standard AM or FM radio receiver for receiving broadcasted text recorded as audio tones along with the audio radio broadcast;

FIG. 21 is a schematic showing the timing format of the broadcast text data and the audio signals for the adaptor shown in FIG. 20; and FIG. 22 is a schematic showing an alternate timing format of the broadcast text data and the audio signals for the adaptor shown in FIG. 20.

DETAILED DESCRIPTION OF THE INVENTION

TEXT AND AUDIO ON SEPARATE CHANNELS EMBODIMENT

Figure 1:
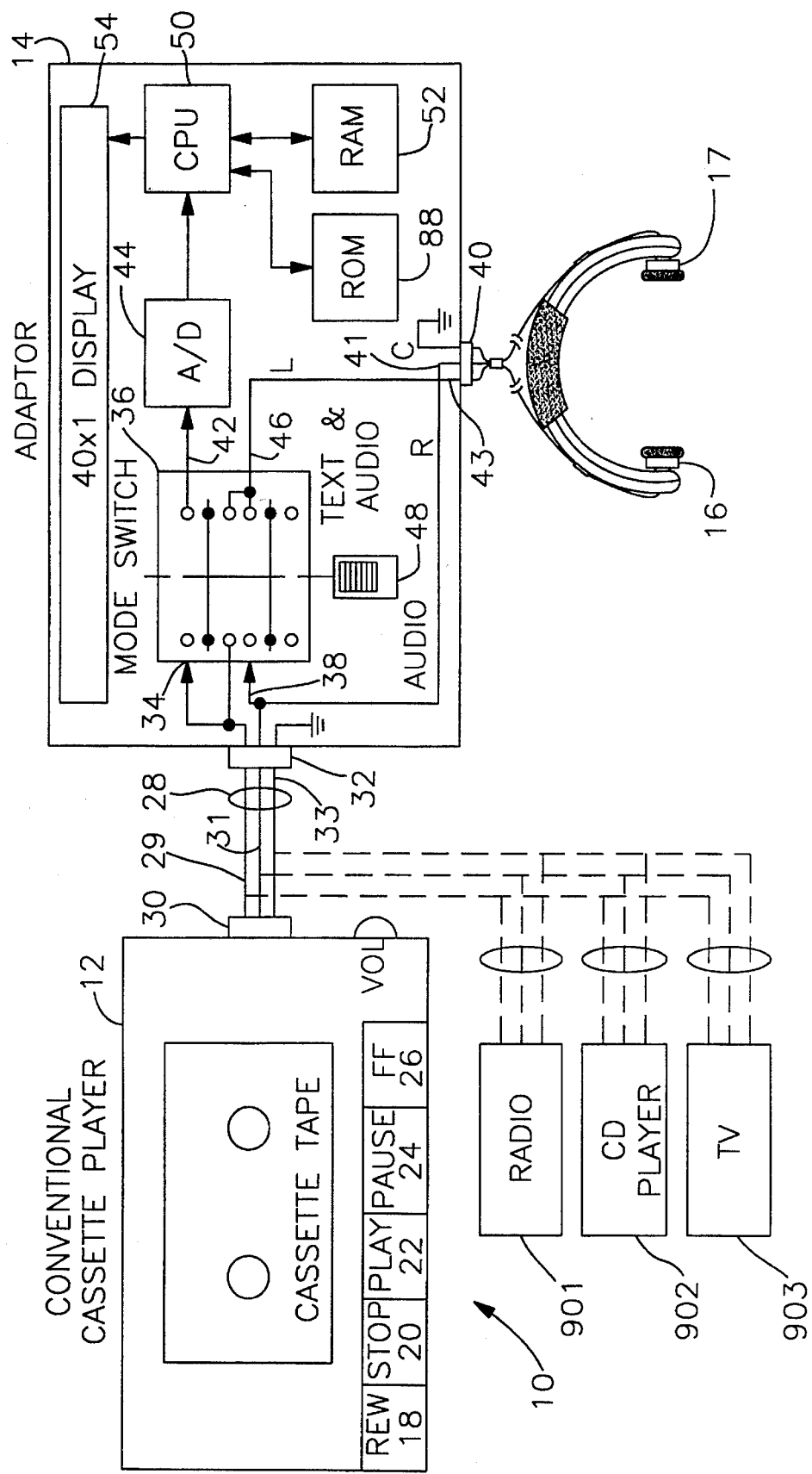
FIG. 1 is a functional block diagram of a system for playing a cassette tape on a conventional tape player where the tape contains text data that are recorded on one stereo channel, and audio information understandable to the user that is recorded on the other channel according to the principles of this invention.

FIG. 1 is a functional block diagram of a system for playing a cassette tape on a conventional tape player where the tape contains text data (song lyrics, for example) that are recorded on one stereo channel, and audio information understandable to the user (orchestra or vocal music, for example) that is recorded on the other stereo channel according to the principles of this invention. The system 10 comprises a conventional audio tape cassette player 12, an adaptor 14, and stereo sound transducers (speakers or headphones, for example) 16, 17. (The stereo sound transducers are hereinafter referred to as headphones, but the invention is not limited to headphones.) The tape player 12 (also referred to as a cassette player or as a cassette tape player) is a standard audio cassette player that plays magnetic tape stored on two reels mounted in a rigid plastic housing. Alternatively, the tape player 12 may be a reel-to-reel tape player that plays magnetic tape stored on a single tape reel that is not mounted in a housing. As described below, the tape player 12 may be replaced with most any other stereo audio source, such as a CD player 902, AM or FM radio receiver 901, or TV 903. Alternatively, the adaptor 14 may be integrally mounted with the audio source device.

Figure 2:
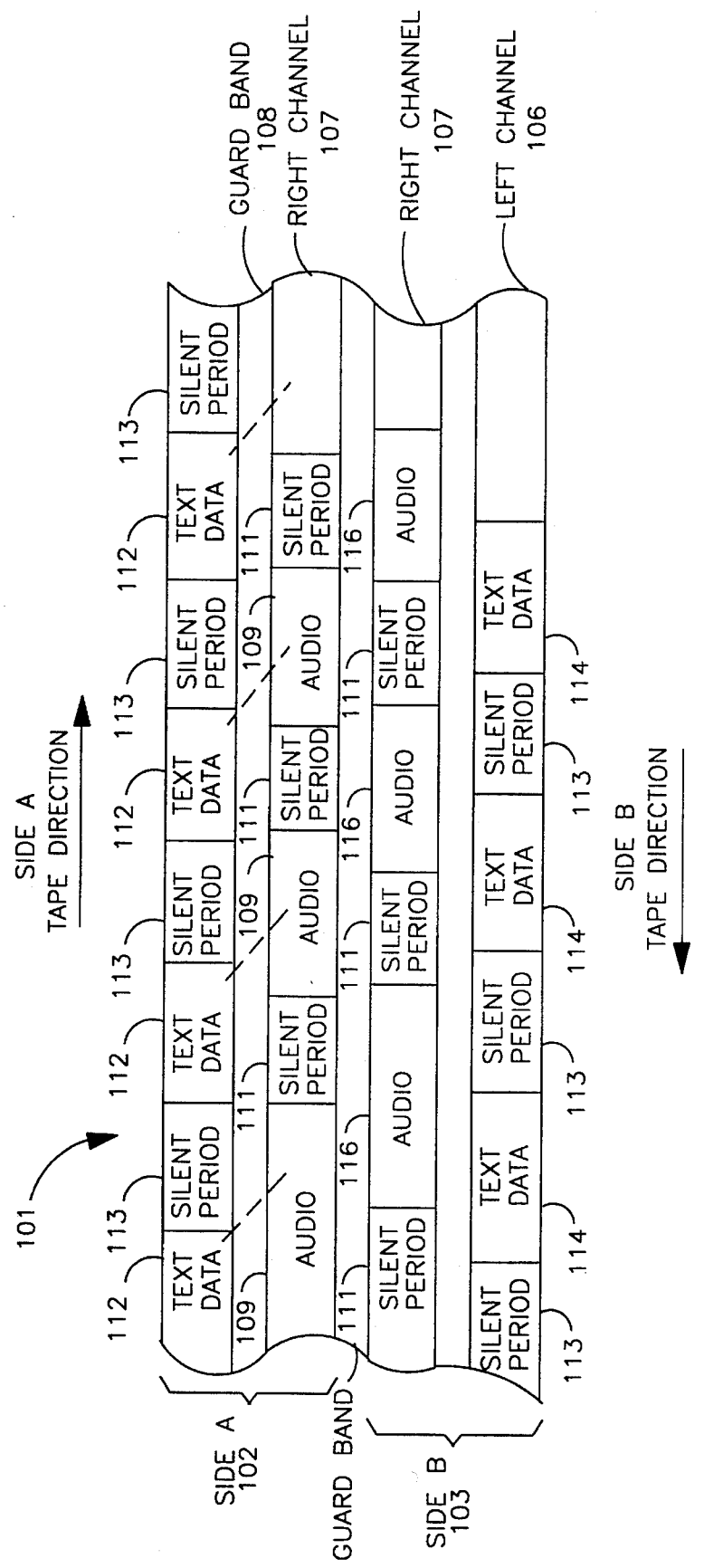
FIG. 2 is a schematic view showing the recording format for the magnetic tape for the adaptor shown in FIG. 1.

FIG. 2 is a schematic view showing the recording format for the magnetic tape for the adaptor shown in FIG. 1. The recording format for cassette tapes is well known to those skilled in the art. Briefly, a magnetic tape 101 is divided into a side A 102 and a side B 103. (A side is also referred to as a track.) Each side is approximately one half of the width of the magnetic tape and are separated by a guard band 104. For a stereo recording, each half-width wide track is further split into a left channel 106 and a right channel 107 separated by a guard band 108. For stereo music, music is recorded in both the left and right channels. For recording karaoke or sing-along lyrics in the invention, the music is recorded in the right channel 107 and the lyrics are recorded in the left channel 106. The reverse can also be accomplished. As used herein, music may be orchestrated with vocals. In the preferred embodiment, the lyrics are recorded on say the left channel as audio tones at audible frequencies, preferably between 100 and 5000 Hz. The range of audio frequencies for reading the audio data tones for all of the embodiments herein is chosen to be within the range of frequencies which can be reproduced and provided with clarity to an audio output of the audio source, such as the tape player 12. In general, substantially all consumer audio products can faithfully reproduce audio tones in the 100 Hz to 5 KHz range. These tones represent digital data, and may be recorded as audio tones using any one of a number of well known modulation methods, such as amplitude modulation, frequency modulation, phase modulation or duty cycle modulation. The data may also be recorded as dual tone multifrequency (DTMF) signals. DTMF signals are used in push button telephones and are well-known to those skilled in the art. Encoding digital data as audio tones is well known in the art, and is extensively used to transmit digital data over telephone lines in digital computer modem applications, as well as for communicating between facsimile machines.

In the preferred embodiment, the audio signals in monaural format are recorded in audio segments 109 in the right channel 107 which are separated by silent periods 111. The text is related to corresponding audio signals and is recorded in text data segments 112 in the left channel 106 which are separated by silent periods 113. The text data segments 112 are longitudinally offset from the audio segments 109 so that the text data may be read, decoded, and processed, as described below, for displaying the text data substantially simultaneously with playing the corresponding audio signal. For example, in a sing-along tape, the lyrics to the song are displayed slightly before the corresponding music of the song. The invention is easily adaptable for other applications in which it may be desirable to display the text before or after the audio. For example, in language applications where the text is a translation in a first language and the audio is a spoken translation in that or a second language, the text translation may be displayed either before the spoken word is played, allowing the user to speak the word before hearing it, or after the spoken word, allowing the user to hear the word and mentally translate it before seeing the translation.

Side B 103 may also contain the text data and audio in the left channel 106 and the right channel 107 respectively, as shown, or may contain audio signals only in both channels in the conventional left and right stereo format. With this latter arrangement, the listener plays side A 102 for the text plus monaural audio mode and side B 103 for the stereo audio mode. This alternative requires twice the tape because each side contains the complete audio information. It should be noted that all text plus audio tapes may apply these principles of containing stereo audio only on side B and text plus monaural audio on side A.

Referring back to FIG. 1, movement of the magnetic tape is controlled by control buttons located on the front panel of the cassette player 12. The control buttons are standard control buttons for a cassette player and include a rewind button 18, a stop button 20, a play button 22, a pause button 24, and a fast-forward button 26. The control buttons are well known to those skilled in the art. A tape volume controller 27 controls the amplitude level of the audio signals provided from the tape player 12 at an audio output connector 30. This connector 30 may be designated as a headphone jack, a line output jack, or a speaker output jack, depending on the construction of the player 12.

Audio signals read from the magnetic tape are communicated from the cassette player 12 to the adaptor 14 by electrically connecting a stereo cable 28 between the audio output connector 30 on the cassette player 12 to an audio input connector 32 on the adaptor 14. The audio cable 28 has a left channel wire 29 for communicating the audio signal from the left channel of the magnetic tape, a right channel wire 31 for communicating the audio signal from the right channel of the magnetic tape, and a common ground wire 33 for providing a common ground between the tape player 12 and the adaptor 14.

Internal to the adaptor 14, the left channel wire 29 is also connected from the audio input connector 32 to an input terminal 34 on a mode switch 36. The right channel wire 31 is similarly connected from the audio input connector 30 to an input terminal 38 on the mode switch 36, but, unlike the left channel wire 29, it is also connected to a right channel output pin 41 of an audio output connector 40 on the adaptor 14. The common ground wire 33 is grounded in the adaptor 14. Power supply and associated connections and grounds, other than common grounds between the tape player 12, adaptor 14, and headphones 16, 17 are not shown. An output terminal 42 on the mode switch 36 is connected to an analog-to-digital converter 44. An output terminal 46 on the mode switch 36 is connected to a left channel output pin 43 of the audio output connector 40.

The input impedance of adapter 14 is selected to match the output impedance of the audio source, e.g. player 12. Typically, the output impedance of various types of audio source outputs are as follows: the impedance of a headphone output is about 1000 ohms, the impedance of a line output is between 1000 and 5000 ohms, and the impedance of a speaker output is 4 to 8 ohms. Therefore, the input impedance of analog-to-digital convertor 44 and the input impedance of the stereo sound transducer 16, 17 are selected to be about 1000 ohms if audio input connecter 32 is a headphone jack, between 1000 and 5000 ohms if connector 32 is a line input jack, and 4 to 8 ohms if connector 32 is a speaker input jack. If an impedance transformation becomes necessary to match impedances because adapter 14 is designed to accept different types of audio source outputs, e.g., headphone, line input, and speaker input, an impedance matching circuit could be incorporated into an adapter that is inserted between cable 28 and connector 32. The same adapter could be designed, in a manner well known to those skilled in the art, to accommodate jacks having different diameters for the different types of audio source outputs.

The mode switch 36 is controlled by a tape select button 48 mounted on the front panel of the adaptor 14. The listener selects either a text plus audio mode for playing tapes having text and audio recorded thereon (such as karaoke, sing-along and language learning tapes), and an audio mode for listening to conventional audio tapes. The tape select button 48 switches the mode switch 36 between connecting the left channel audio to either the analog-to-digital convertor 44 or to the left channel output pin 43 of the audio output connector 40 of the lyrics adaptor 14. Although the mode switch 36 is shown schematically as a mechanical switch, it alternatively may be a solid state switch, the design of which is well known to those skilled in the art.

In the text plus audio mode, the tape select button 48 causes the mode switch 36 to electrically connect the input terminal 34 to the output terminal 42 for communicating the left audio channel signal from the audio input connector 32 to the analog-to-digital converter 44 and to simultaneously electrically connect the input terminal 38 to the output terminal 46 for communicating the right audio channel signal from the audio input connector 32 to the left channel output pin 43 of the audio output connector 40. In this mode, the right audio channel is provided through both the left and right channel output pins 43, 41 of the audio output connector 40, thereby providing the monaural output to both left and right sound transducers.

In the audio mode, the tape select button 48 causes the mode switch 36 to electrically connect the input terminal 34 to the output terminal 46 for communicating the left audio channel signal from the audio input connector 32 to the left channel output pin 43 of the audio output connector 40. In this mode, the right and left audio channels are provided from the right and left output pins 41, 43, respectively, of the audio output connector 40 to form a stereo output signal.

The audio output connector 40 is electrically connected to the headphones 16, 17. Alternatively, the headphones 16, 17 may be standard stereo speakers external to the adaptor 14 or, alternatively, the speakers may be mounted on or within the adaptor. The audio output connector 40 has preferably the same physical and electrical configurations as the audio output connector 30 on the cassette player 12 to allow the listener to interchangeably electrically connect the headphones 16, 17 or stereo speakers to either the cassette player 12 or the adaptor 14 without changing the connector on the speakers or headphones. The volume of the audio signals provided to the headphones 16, 17 is controlled by the volume controller 27 on the tape player 12. Alternatively, and preferably, the lyrics adaptor 14 may also have a volume controller.

Turning now to the electronics for processing the text data, the analog-to-digital (A/D) converter 44 converts the left channel audio tone signals into a resultant digital data signal which is provided to a central processing unit (CPU)

50. The A/D converter 44 includes the necessary demodulator circuits to recover data from the modulated audio tones and also preferably includes error detection circuits to detect incoming audio tones which do not conform to the proper tone modulation protocol. The CPU 50 stores the digital data signal in a random access memory (RAM) 52. A read-only memory (ROM) 88 has stored therein the operating program for the CPU 50. The CPU 50 also processes the digital data and converts it into a display format and transfers the display data to a display 54 (and suitable display driver, not shown) in accordance with display control codes embedded in the display data, such as a line feed (LF) control code. Use of display control codes for displaying text is well known in the art and is used herein in conjunction with display and printer apparatus. The display 54 is preferably a forty character by one line liquid crystal display. The display 54 is not limited to a forty character by one line display but may have any number of characters or lines.

With the structure of the system 10 now defined, the operation of the system is now described. The listener inserts either a standard audio cassette tape or a text plus audio cassette tape into the cassette player 12. If the inserted tape is a standard audio tape or the "audio only" side of a text plus audio tape, the listener switches the tape select button 48 to the "audio" position. In this position, the mode switch 36 connects the input terminal 34 to the output terminal 46 as described above. After switching the tape select button 48, the listener presses the play button 22 on the cassette player 12 to begin playing the audio. The audio signal on the left channel of the cassette player 12 is communicated over the left audio channel wire 29 to the input terminal 34 and through the mode switch 36 to the output terminal 46 on the mode switch. The left audio signal is then communicated to the left channel output pin 43 of the audio output connector 40 and to the headphones 16, 17. The audio signal on the right channel is similarly communicated over the right audio channel wire 31 to the audio input connector 32, but it also is directly communicated, inside the adaptor 14, to the right channel output pin 41 of the audio output connector 40 and to the headphones 16, 17. In the audio mode, the system 10 provides stereo music to the listener. In this mode, the analog-to-digital convertor 44, the CPU 50, the RAM 52, the ROM 88 and the display 54 are not required to be operational. Alternatively, the CPU 50 may be programmed to transmit messages on the display 54 informing the listener that the adaptor 14 is in the audio mode.

On the other hand, if the inserted tape is a text plus audio tape, the listener switches the tape select switch 48 to the text plus audio position. In this position, the mode switch 36 connects the input terminal 34 to the output terminal 42 and the input terminal 38 to the output terminal 46 as described above. After switching the tape select button 48, the listener presses the play button 22 on the cassette player 12 to begin playing the tape. The audio signal on the left channel containing the text is communicated from the cassette player 12 over the left audio channel wire 29 to the input terminal 34 and through the mode switch 36 to the output terminal 42. The left audio signal is then communicated to the analog-to-digital convertor 44 which transforms the audio signal into a digital signal. The CPU 50 receives the digital signal and stores it in the RAM 52.

In parallel, the audio signal on the right channel is communicated over the right audio channel wire 31 to the right channel output pin 41 of the audio output connector 40 and to the headphones 16, 17. In addition, the audio signal on the right channel is also communicated to the input terminal 38 on the mode switch 36 where it is communicated to the output terminal 46 and to the left channel output pin 43 of the audio output connector 40 and to the headphones 16, 17. Thus, as described above, the audio signal on the right channel of the cassette tape is monaurally played over both the right and left channels of the output of the adaptor 14 and the headphones 16, 17. As the audio is played, the CPU 50 reads the text associated with the audio from the RAM 52 and displays it on the display 54. The listener reads the text as the audio plays. Preferably, the text is formatted and displayed one line at a time, but could be scrolled across the screen.

Returning to FIG. 2, the text/audio format shown for side A 102 is one which might be used for a language application, where the text data 112 is displayed following the audio segment 109 to which it applies (shown by dotted line). Therefore, the text data 112 is staggered to follow slightly after the corresponding audio portion 109. The text/audio format shown for side B 103 is one which might be used for a Karaoke or sing-along application, where text data (lyrics) 114 is displayed before a corresponding vocal or orchestral phrase 116 to which it pertains. In such instance, the audio data block 116 is staggered to follow slightly after the corresponding text portion 114.

Note that silent periods are provided to separate adjacent blocks of text and audio. Such silent periods facilitate finding the beginning of each audio selection. In particular, some tape players 12 include a feature referred to as automatic music search (AMS), where the player can automatically fast forward to the next silent period on a tape, and then switch to play mode. Thus, the silent periods can be used to advantage with such a system to rapidly find a desired program selection.

STEREO AUDIO EMBODIMENT

Figure 3:
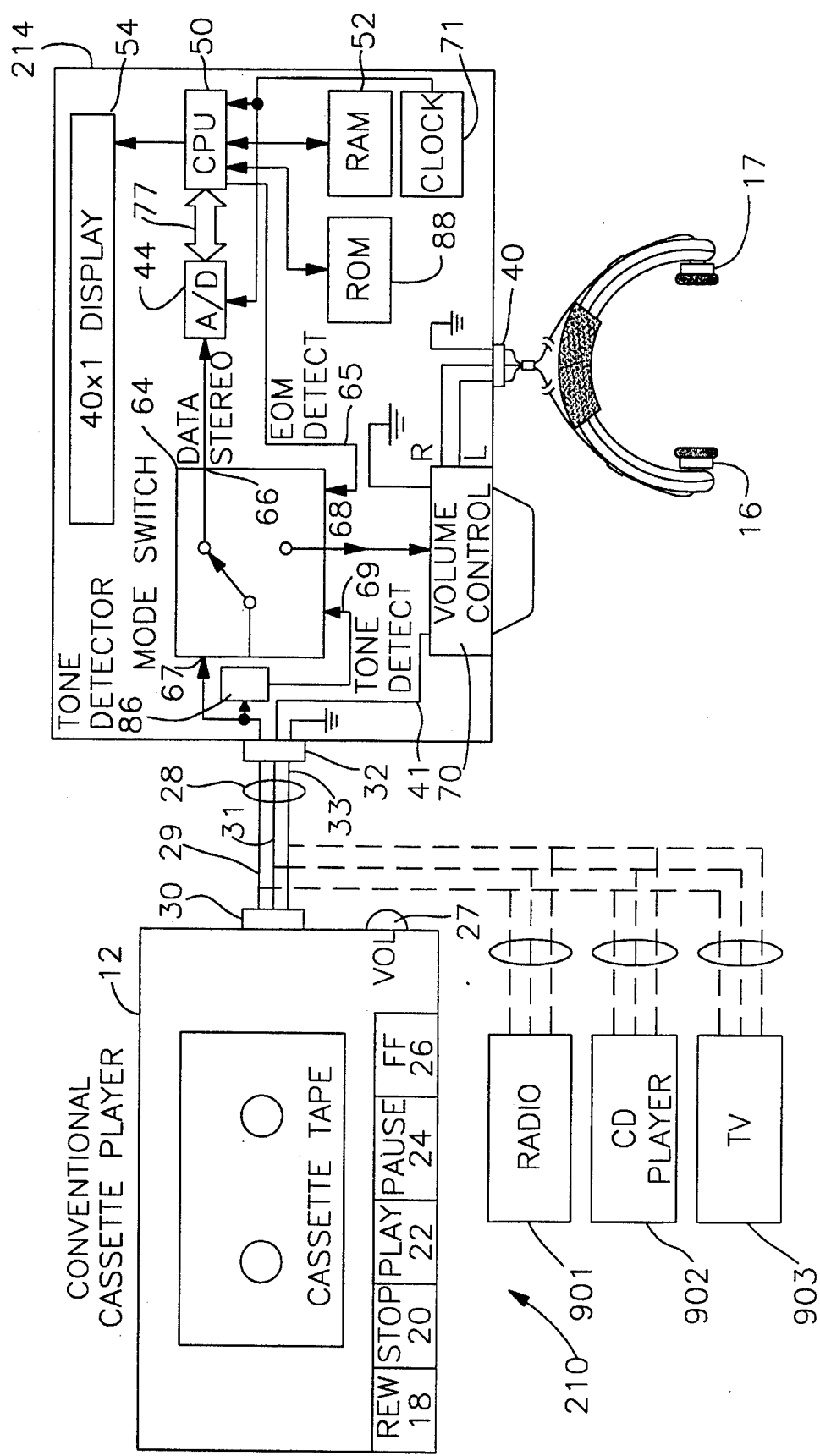
FIG. 3 is a functional block diagram showing an alternate embodiment of the adaptor for use with a tape having recorded thereon interleaved text data and audio signals according to the principles of the invention.
Figure 4:
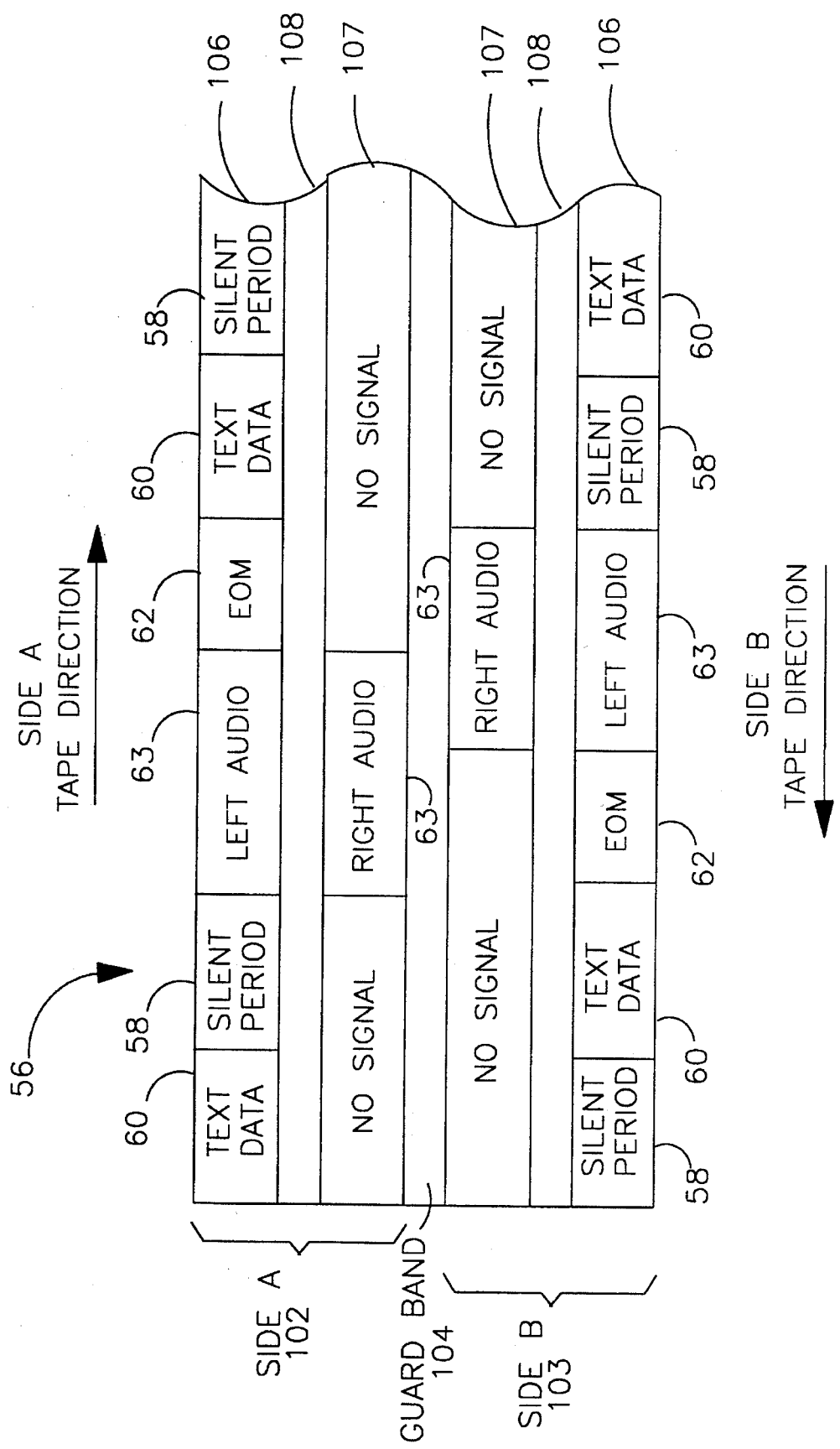
FIG. 4 is a schematic view showing the recording format for the magnetic tape for the adaptor shown in FIG. 3.
Figure 5:
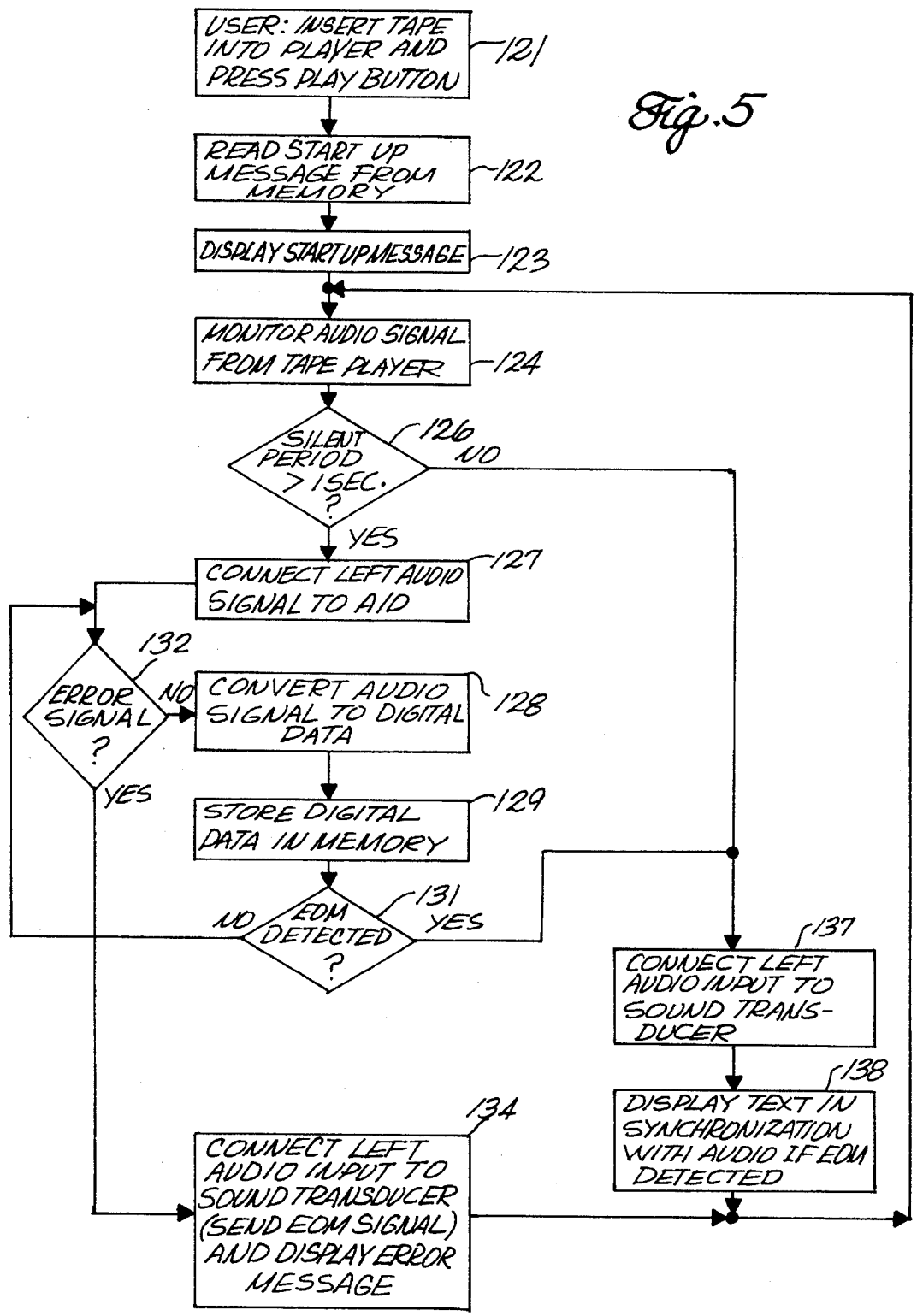
FIG. 5 is a flow chart showing the steps employed in operation of the adaptor shown in FIG. 3.

FIG. 3 is a functional block diagram showing an alternate embodiment of the adaptor for use with a tape having recorded thereon interleaved text data and audio signals in the same channel according to the principles of the invention. FIG. 4 is a schematic view showing the recording format for the magnetic tape for the adaptor shown in FIG. 3. FIG. 5 is a flow chart showing the steps employed in operation of the adaptor shown in FIG. 3; Like elements in FIG. 3–4 have like numbers for like elements in FIG. 1–2.

In this embodiment, a system 210 provides stereo audio and displays text data related to the stereo audio in synchronization with the stereo audio. In a preferred embodiment, the audio is orchestral music and may also include vocals, and the text data is lyrics related to the music. Referring to FIG. 4, a magnetic tape 56 has an identical two side and four track configuration as the magnetic tape 101 described above in FIG. 2. In particular, the tape 56 has a side A 102 and side B 103 separated by a guard band 104 and where each side has a left channel 106 and a right channel 107 separated by a guard band 108. In the embodiment shown in FIG. 4, the text data and control signals are recorded in the left channel 106. Alternatively and equally effective, these signals may be recorded in the right channels 107. As will be described below in FIG. 12, these signals may be recorded in both the right and left channels.

The left channel 106 of side A 102 and side B 103 are each divided into sections containing a first control signal 58, text data 60, a second control signal 62, and left channel stereo audio 63. The right channel 107 of both sides contains only a right channel audio section 63 that is located opposite the left channel audio section 63 in the left channel 106. The first control signal 58 is preferably a silent period so that the listener does not hear the start of the text data or the first control signal. The silent period is preferably greater than a predetermined duration so that the system 210 is able to distinguish between formatted silent periods and quiet or silent periods during a musical selection, such as a pianissimo. The silent period 58 preferably has a duration greater than two seconds. The text data 60 is recorded, following the silent period 58, on the left audio channel 106.

The second control signal 62 is an end of message (EOM) code, following the text data 60, that indicates the end of the text and causes the system 210 to connect the left audio output of the tape player 12 to the headphones 16, 17 and to disconnect it from the display processing circuits, as will be described below. The left channel stereo audio 63 is recorded on the tape 56 following the end of message code 62. This sequence is repeated along the length of the tape on sides A and B, or alternatively only on one side. The sequence of these segments is reversed for side A and B because the tape moves in opposite directions for each side.

Referring back to FIG. 3, the system 210 comprises a cassette player 12, an adapter 214, and headphones 16, 17. The cassette player 12 is the standard cassette player described above for FIG. 1. The cassette player 12 is connected to the adapter 214 by an audio cable 28 between an audio output connector 30 on the cassette player 12 and an audio input connector 32 on the adapter 214 in a manner similar to that described above for FIG. 1.

The left channel audio signal is provided on line 29 to a tone detector 86 that monitors the signal level of the inputted left channel audio signals. The left channel audio signals are also communicated to an input terminal 67 of a mode switch 64. The mode switch 64 switches between communicating the left channel audio signals to either a data terminal 64 or a stereo terminal 68. When silence of more than one second is detected, the tone detector 86 sends a silence detect signal on line 69 to the mode switch 64 causing it to connect the left channel audio signals to the data terminal 66 which is connected to an analog-to-digital (A/D) converter 44. The digital signals from the analog-to-digital converter 44 are provided on a bus 77 to a CPU 50 which transfers the digital data to a RAM 52 in a manner similar to that described above in FIG. 1. A clock 71 provides clock or timing signals to the A/D converter 44 and the CPU 50.

Upon detecting on the left channel the end of message code 62 at the end of the text data 60, the CPU 50 issues an EOM detect signal on line 65 to the mode switch 64 commanding the switch to electrically connect the left channel audio output signal to the stereo terminal 68, which is connected along with line 41 (carrying the right channel audio signal) to a stereo volume controller 70 on the adapter 214. In a manner similar to the volume controller 27 on the tape player 12, the volume controller 70 controls the amplitude of the signal applied to the headphones 16, 17 to thereby control the volume of the sound generated by the headphones.

When the tape 56 is played in a standard cassette player 12 without interposing the adapter 214 between the tape player and the headphones 16, 17, the listener hears the text data 60 as audio tones between the silent period 58 and the song 64. To reduce the annoyance of the data tones, the text data 60 is recorded at low volume relative to the stereo audio. To maximize the ability of the tone detector 86 to detect the silent period 58, the listener preferably turns the volume controller 27 on the cassette player 12 to the maximum setting and uses the volume controller 70 on the adapter 214 to control the volume of the audio signals played by the headphones 16, 17. At power turn on, the CPU 50 reads, from the RAM 52, a message for displaying on the display 54 that instructs the listener to turn the volume controller 27 on the cassette player 12 to the maximum volume setting and to control the output volume to the headphones 16, 17 by the volume controller 70 on the adapter 214.

With the structure of the system 210 now defined, the operation of the system is now described. Referring to FIG. 5, the user inserts a cassette tape into the cassette player 12 and presses the play button 22 (Step 121). (The flowcharts of FIGS. 5, 6, 7, 11, 12, 14, 15, 16, and 19 are for programs that are preferably executed by the CPU 50.) If there is power turn-on for the adapter 214, the CPU 50 reads from the RAM 52 a start-up message (Step 122) and displays the start-up message on the display 54 (Step 123).

As a default condition upon power-up, the mode switch 64 connects the left channel audio signal to the stereo terminal 68, and the detector 86 monitors the audio signal from the tape player 12 (Step 124). If a silent period greater than 1 second is detected on the monitored signal, the detector 86 sends a silence detect signal to the mode switch 64 (Step 126). In response, the mode switch 64 connects the audio signal to the A/D converter 44 (Step 127). The A/D converter 44 is configured to recognize a particular type of audio tone as a text data tone, which is converted to digital code. The particular type of tone depends on the modulation method chosen (FM, PWM, DTMF, etc.). In the event audio signals are presented to the A/D converter 44 which do not meet the correct modulation format, the A/D converter 44 provides an error signal on the bus 77 to the CPU 50. This error can occur, for example, if conventional audio signals are routed to the converter 44 by the mode switch 64 as a result of a timing error or a missed end of message code. If an error signal is received from the A/D converter 44 (Step 132), the CPU 50 presumes that the mode switch 64 is in the wrong position (i.e., improperly in the text mode), and the CPU sends an end of message signal to the mode switch 64 to connect the left channel audio input to the sound transducer (Step 134). The CPU 50 may also command the display to display an error message (Step 134). The CPU 50 then returns to the main program by monitoring the audio signal at step 124 as described above.

On the other hand if no error is detected, the A/D convertor 44 converts the audio signal to digital data and provides the data to the CPU 50 (Step 128). The CPU 50 stores the digital data in the RAM 52 (Step 129) and looks for an end of message (EOM) code (Step 131). If no EOM code is detected, the CPU 50 returns to step 132 and looks for an error signal.

If an EOM code is detected (Step 131) or if a silent period greater than 1 second is not detected at step 126, the CPU 50 puts the adapter into the left audio mode and commands the mode switch 64 to connect the left audio input to the sound transducer (Step 137) and displays the text in synchronization with the audio if an EOM signal has been detected (Step 138) as will be described in detail below.

In a language application of the system 210, the display is the translation of a word or phrase being heard. In particular, the stereo audio 64 is a recording of a spoken word, phrase, sentence or paragraph in a first language, such as Chinese. The text data 60 preceding (or following) the stereo audio 64 is a translation of the spoken words into that language or a second language, e.g. English. The CPU 50 stores the processed text in the RAM 52 and displays it on the display 54 before, during, or following the pronunciation of the spoken words. The text is held in the display until another silent period is encountered. At the next silent period, the CPU 50 clears the display 54 and repeats the process by displaying the next phrase.

In a musical lyrics application of the invention, for karaoke or sing-along, the text is recorded in a burst mode on the tape. In particular, the text before each audio selection is the entire set of lyrics for the upcoming song along with timing data to indicate, from the start of the song, when each line of lyrics is to be displayed. The text and timing data for the entire song is stored in the RAM 52. In this application, larger memory capacity is required. For example, four words per second may be sung in fast songs. At this rate, a three minute song yields a memory requirement of approximately 24 kilobits. Thus, the memory capacity of the RAM is at least 24 kilobits.

In order to synchronize the text with the audio, the text data must include timing information. This text format will be described in terms of music and lyrics; however, the invention is not limited to music and lyrics.

The actual creation of the lyric and lyric timing data for recording on a master tape or CD is as follows. The first step is to either manually enter the lyrics into a computer (using a keyboard) to obtain the lyrics in computer readable form from another source, such as the artist or music publisher. The lyrics are then partitioned into lines, generally from three to ten words, so that the entire line can be displayed at one time on the 40 character display 54 of the adapter 214. Additionally, the lyrics can be partitioned into multi-line phrases for display on a multi-line display.

Once the lines or phrases are determined, the second step is begun by playing a tape or CD recording of the lyrics on a professional tape or CD player which allows the music to be listened to at adjustable speeds, if necessary, allowing the user to pinpoint the actual time at which each word of the lyrics begins to be sung. It is sometimes important to precisely determine the lyric timing because certain music, particularly rap, often reaches four words per second during a musical selection. Once the beginning of a word is detected by the listener, the listener signals the computer that the word has begun to be sung. The computer automatically stores the minute and second data from a timing output signal also provided by the tape or CD player and associates this information with the word that is being sung. The second step is repeated until timing data (representing elapsed time from start of song) is stored for every word in the musical selection.

By using this process, lyrics files that include phrasing and timing data for any musical selection can be generated using the computer and tape or CD player combination. An example of how this information can be stored is shown below. The beginning of each phrase is denoted by a tilde (~). The end of each line within a phrase is denoted by an "at" symbol (@). The end of each word is denoted by a vertical bar (^). Thus the phrasing data for "Mary had a Little Lamb" may look like the following:

~Mary|had|a|little|lamb@| little|lamb|little|lamb^|

~Mary|had|a|little|lamb@| whose|fleece|was|white|as|snow^|

Timing data can be added by inserting a number consisting of the minute and second time data received from the tape or CD player, with leading zeros deleted after each word of the lyrics, separated by another vertical bar (|) and with a space before the number to distinguish timing numbers from lyrics that happen to be numbers. Thus the phrasing of Mary had a Little Lamb including time data may look like the following:

~Mary|448|had|524|a|552|little|573|lamb@|648 little|723|lamb|773|little|848|lamb^|923

~Mary|973|had|1048|a|546|little|1122|amb@|1173 whose|1227|fleece|1248|was|1301|white|1323|as|

1351|snow^|1373

The timing data for each word is used if it is desirable to provide word highlighting (e.g. underline, bold, color) in synchronism with the melody, while phrase data is used for multi-line displays. For the one line display embodiment shown, only line timing and partition data are required.

Now the processing of the text for display will be described. As described above in FIGS. 4–5, during the silent period 58, the adapter 214 switches to the data mode and disconnects the left channel audio output to the left headphone speaker 16. The user hears silence while the text data 60 is read from the tape (there is nothing recorded on the right channel in the interval where data is recorded on the left channel). This process typically takes less than four seconds for music applications. Upon reading the EOM code 62, the adapter 214 switches to the audio mode and provides the left channel stereo audio signals to the left headphone speaker 16, while the audio signals on the right channel begin to be heard in the right speaker 17 of the headphone, providing stereo sound to the user.

Figure 6:
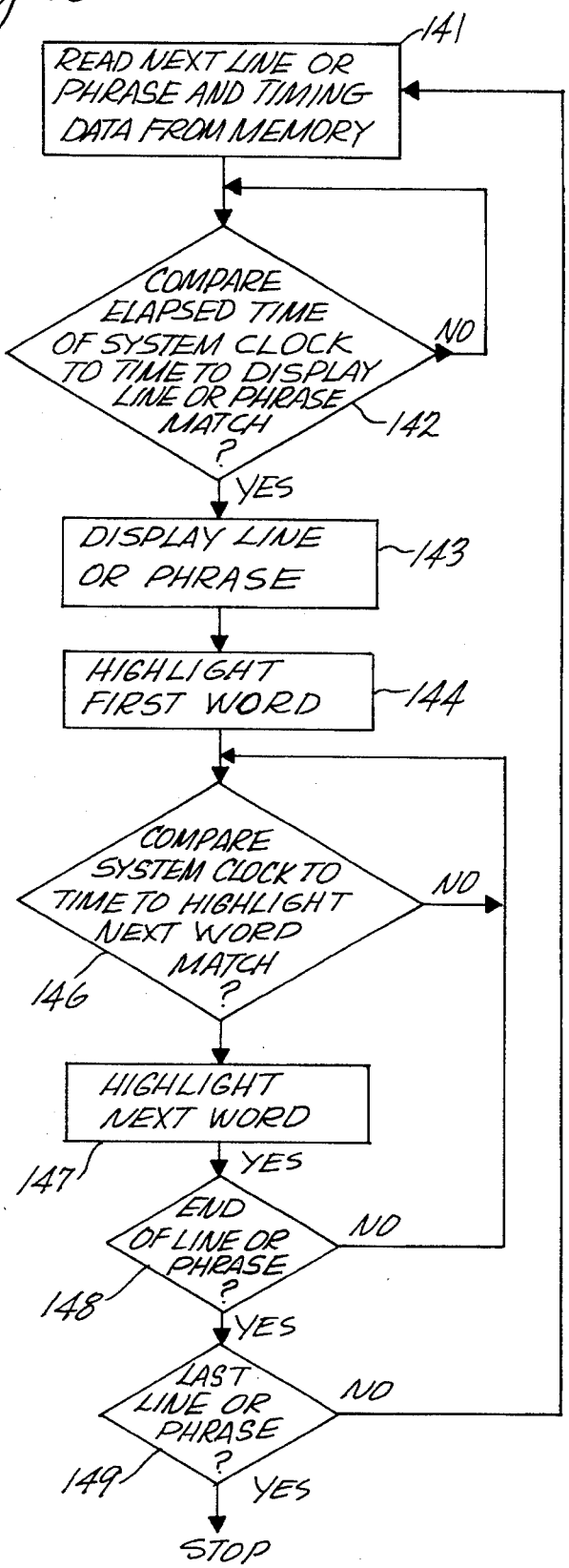
FIG. 6 is a flow chart showing the steps for displaying the text in synchronization with the audio as shown in FIG. 5.

FIG. 6 is a flow chart showing the steps for displaying the text in synchronization with the audio for step 138 in FIG. 5. At this step, the EOM code 62 has been detected and the mode switch 64 has connected the audio signals from the tape player 12 to the speakers 16, 17. The CPU 50 reads the first line or phrase and its timing data from the RAM 52 (Step 141). The timing data includes command codes indicating the start of the line or phrase, the separation of the individual words within the line or phrase, breaks between the lines of text within the phrase and the end of the phrase. The CPU 50 must generate and transmit commands and data, by line or phrase, that will be interpreted by the display (which includes a suitable display driver, not shown) to properly display the lyrics and the highlighting, if any. The CPU 50 then monitors a system clock 71 and compares the elapsed time of the system clock from receipt of the EOM code (which represents the song start time) to the time to display the line or phrase (Step 142). If there is not a match, the CPU 50 continues step 142.

On the other hand if there is a match, the CPU 50 transfers the data to the display 54 (Step 143). The CPU then (optionally) generates a "highlight" command which is sent to the display 54, which highlights the first word of the phrase as soon as the command is received (Step 144).

The CPU 50 then monitors the system clock 71 and compares the elapsed time of the system clock from receipt of the EOM code to the time to highlight the next word (Step 146). If there is not a match, the CPU 50 continues comparing at step 146.

On the other hand if there is a match, the CPU 50 generates another "highlight" command and sends it to the display 54 which then highlights the second word of the line or phrase it received (Step 147). This process is repeated until the highlight command is generated for the last word of the current line or phrase (Step 148). When the entire phrase has been highlighted, the computer then repeats the whole process by returning to step 141 and sending the text data for the next line or phrase to the display 54. When the last line or phrase is reached, the CPU 50 returns to the mode of monitoring the audio signal for a silent period as shown in FIG. 5.

During the playback of the magnetic tape, the speed of the tape varies due to many factors, including variations in the rotation of a capstan that drives the tape at an approximately constant speed or expansion or contraction of the magnetic tape caused by variations in humidity and temperature. These variations are typically within approximately 2% of nominal speed. As a result of variations in the tape play speed, the frequency of the detected text tone signals recorded on the magnetic tape correspondingly shift from their nominal values. It is envisioned that at least one of the audio text or control tones in the group of text data tones will be recorded at a predetermined frequency at nominal recording speed. Because the stored timing data associated with the lyrics is based on a predetermined nominal tape speed which relates directly to song elapsed time, the variations in tape play speed can cause the synchronization of the lyrics of the song melody to be offset from the song as it is being played. By recording at least one of the text data tones at a precise frequency at nominal tape speed, deviations in the tape play speed may be determined by measuring the deviation in frequency of this tone from the established precise frequency, using the clock 71 to establish a frequency measuring standard in a method well known in the art such as detecting zero crossing times and comparing them to a clock standard stored in the ROM 88. This frequency test can be conducted in the A/D converter 44, which has available clock signals to perform A/D conversion. The resultant frequency error signal is provided to the CPU 50 or the bus 77.

Figure 7:
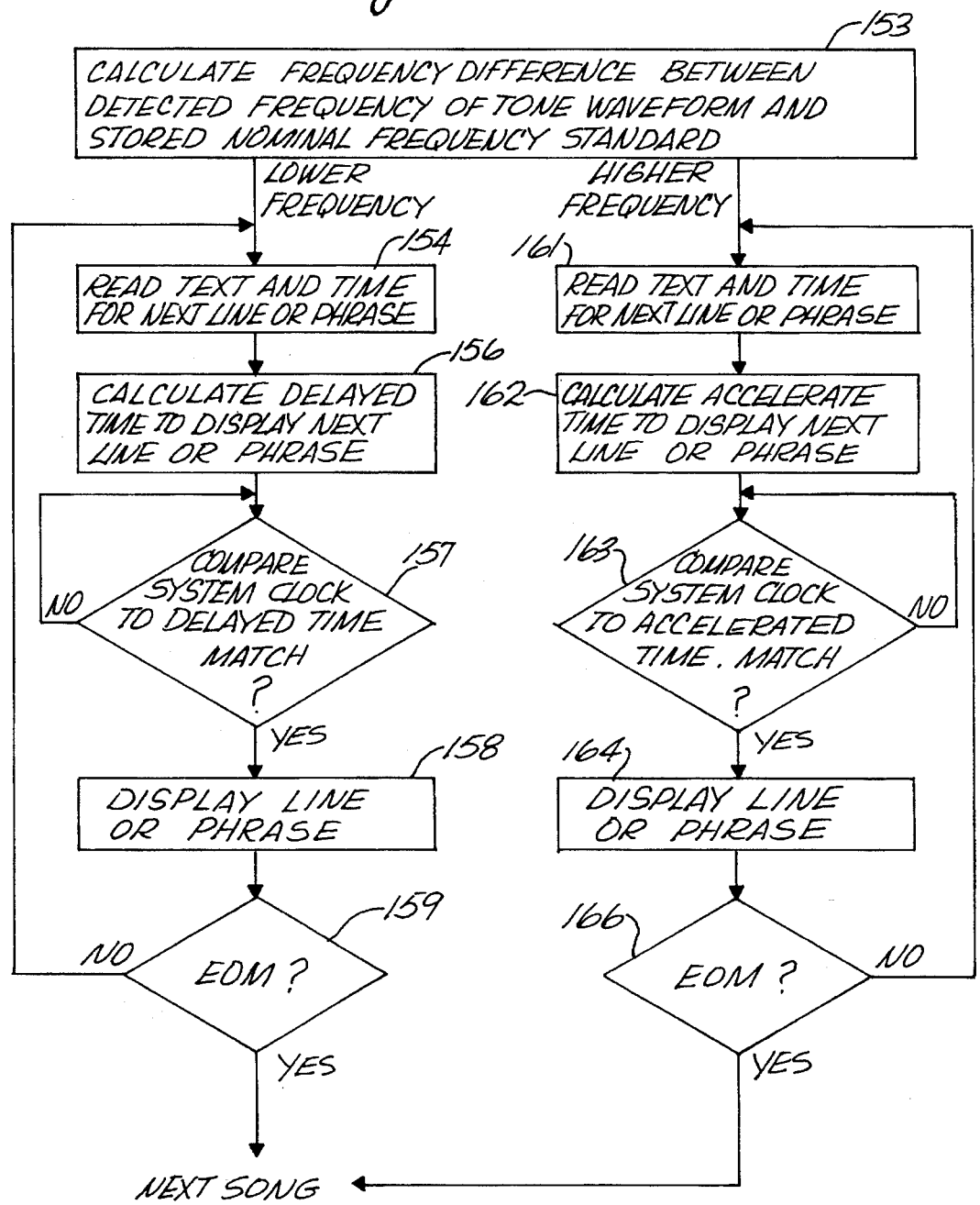
FIG. 7 is a flow chart showing the steps for correcting the tape speed variations.

FIG. 7 is a flow chart showing the steps for correcting for the tape speed variations. By comparing the detected frequency of the tone with the expected nominal frequency standard, the CPU 50 calculates the tape speed variation from the shift in tone frequency (Step 153). As the music is played at a rate different than the expected rate, the CPU 50 adjusts the stored time of display of the lyric data by the difference in time caused by the tape speed variation, to thereby display the lyrics in synchronization with the music. If a lower frequency than the expected frequency is detected, the tape is moving slower than the nominal speed, and the CPU 50 must adjust the timing by delaying the display of the lyrics. The CPU 50 reads the text in time for the next line or phrase from the RAM 52 (Step 154) and calculates the delayed time to display the next line or phrase (or word highlight) (Step 156). The CPU 50 then compares the elapsed time of the system clock 71 to the calculated delay time and continues this comparison until there is match (Step 157). The CPU 50 then transmits the data to the display 54 for displaying the next line or phrase (Step 158). The details of displaying the line or phrase and the highlighting of words within the line or phrase are described in detail above in FIG. 6. The CPU 50 continues monitoring for a stored EOM signal and until one is detected continues reading of the next line or phrase at Step 154 (Step 159). Otherwise, if an EOM signal is detected, the CPU 50 is ready to process data for the next song as described above in Steps 127–131 for FIG. 5.

On the other hand if at Step 153 a higher detected frequency than the expected frequency is calculated, the tape speed is faster than the nominal speed and the displaying of the lines or phrases must be accelerated. The CPU 50 reads the text in the timing data for the next line or phrase from the RAM 52 (Step 161) and calculates the accelerated time to display the next line or phrase (Step 162). The CPU 50 then compares the elapsed time on the system clock 71 to the calculated accelerated time (Step 163) and displays the line or phrase (Step 164) in a manner similar to that described above for Step 158. The CPU 50 monitors for an EOM and until one is detected returns to Step 161 to read the text and time for the next line or phrase (Step 166). When an EOM is detected, the CPU 50 is read to process data for the next song.

In the event a tape recorded with the format shown in FIG. 4 is played in the conventional player 12 without the use of an adapter 214, the text data tone will be heard in the left channel, and may be annoying to the user. Several methods are available to eliminate or reduce this annoyance. First, as mentioned in the previous embodiment, side B of the tape may be configured so that it contains only conventional stereo audio signals, while side A is reserved for the text plus audio signal. While this method requires additional tape (the entire album must fit on one side of the tape) the user without an adapter can listen to side B without data tone distraction. A second method is to record the data tones at a reduced amplitude with respect to the audio, using the volume controllers 27 and 70 in the manner described in the previous embodiment. In conjunction with the reduced amplitude tone heard in the left channel, the tape configuration of FIG. 4 can be modified to record "masking" audio signals in the "NO SIGNAL" areas shown for the right channels. The user without an adapter will hear the masking audio in the right channel at the same time as the lower volume data tones in the left channel. The masking audio in the right channel, which may be an announcer's voice introducing the upcoming musical selection, can act to "mask" the data tones heard in the left channel, minimizing the tone annoyance.

Further, the masking audio may be suppressed by the adapter 214 by using another pole (not shown) on the mode switch 64 in FIG. 3 to disconnect the line 41 from providing the right channel audio to the connector 40 when the mode switch 64 is in the data mode.

ALTERNATE STEREO AUDIO EMBODIMENT

Figure 8:
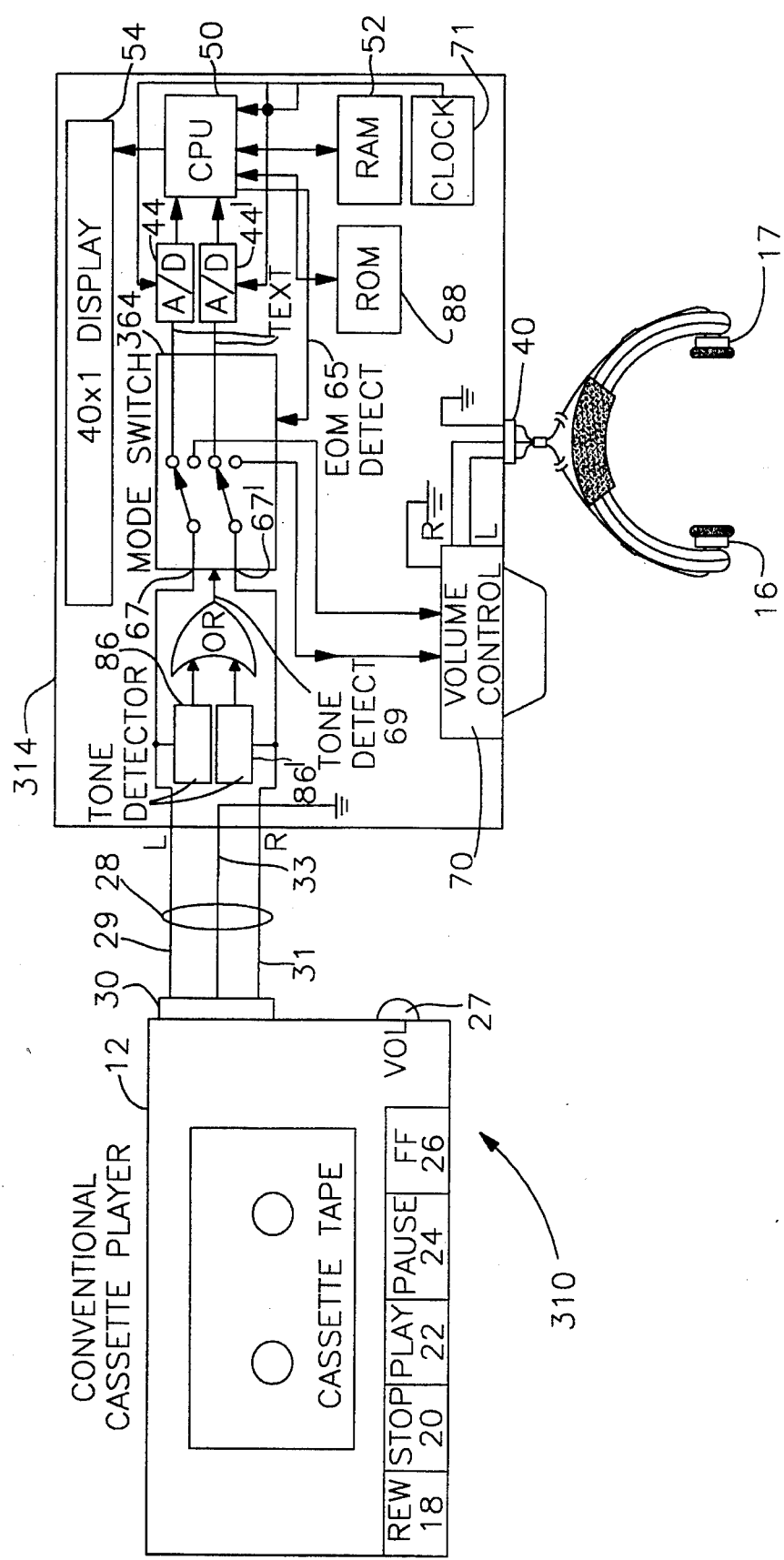
FIG. 8 is a functional block diagram showing an alternate embodiment of the adapter shown in FIG. 3 for use with the tape having recorded thereon interleaved text data and audio signals on both left and right channels of the tape.
Figure 9:
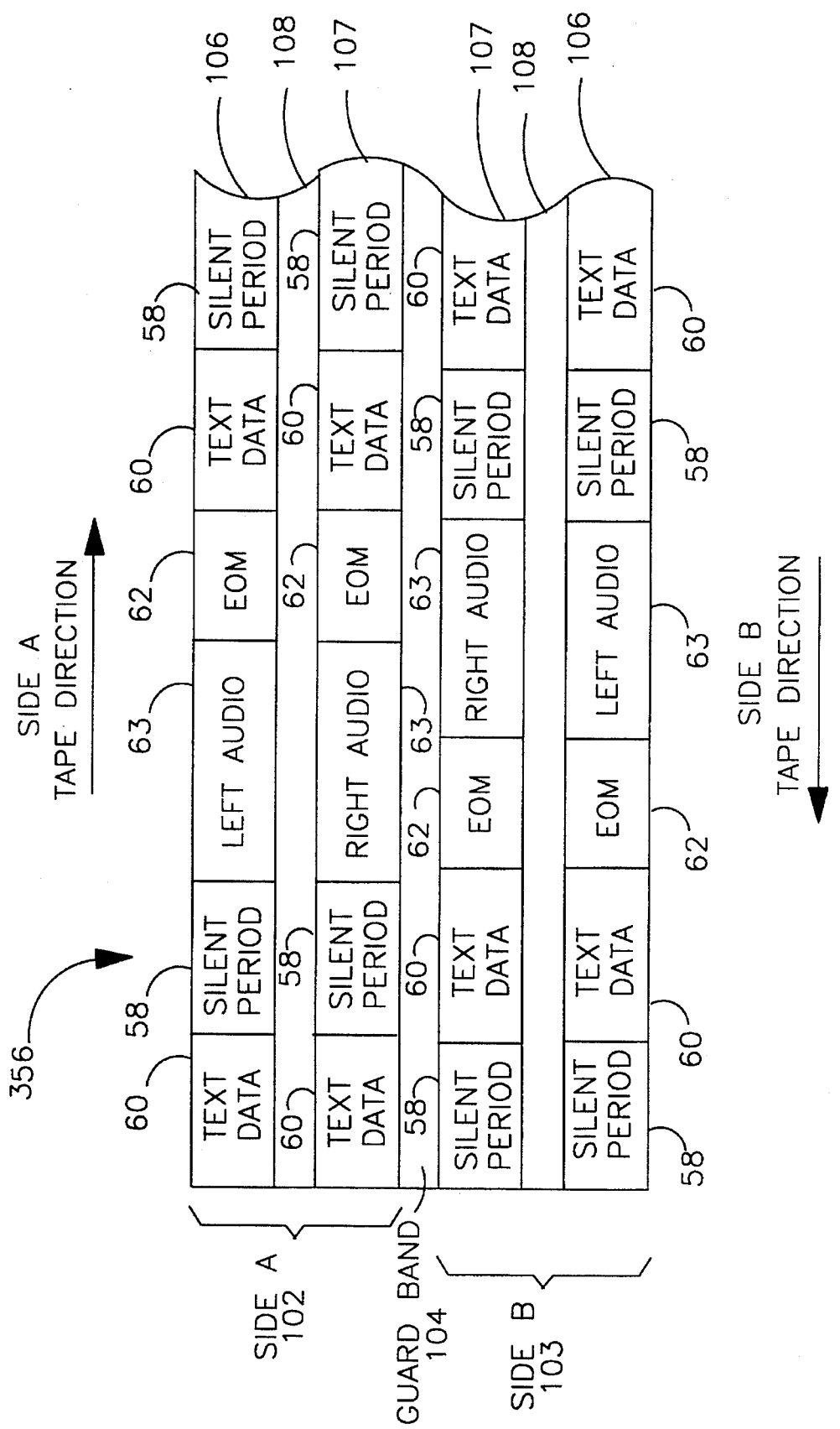
FIG. 9 is a schematic view showing the recording format for the magnetic tape for the adapter shown in FIG. 8.

FIG. 8 is a functional block diagram showing an alternate embodiment of the adapter shown in FIG. 3 for use with the tape having recorded thereon interleaved text data and audio signals on both left and right channels of the tape. FIG. 9 is a schematic view showing the recording format for the magnetic tape for the adapter shown in FIG. 8. Like elements in FIG. 8 have like numbers for like elements in FIG. 3.

In this embodiment, the text data and end of message codes are recorded in both left and right channels. Referring to FIG. 9, a magnetic tape 356 has an identical side and track configuration to the magnetic tape 56 described above in FIG. 3. However, a silent period 58 and text data 60 and end of message code 62 are recorded in the left track 106 and in the right track 107 for both side A 102 and side B 103. By recording the text data in both tracks, the duration of the period of silence while the text data is read is reduced by about one half. The text data is preferably recorded by placing half the data in the left channel and half in the right channel, reducing the text data tape time interval to about one half.

Referring back to FIG. 8, the left channel audio signal from the left channel 106 is communicated on the left channel wire 29 to a tone decoder 86. Similarly, the right channel audio signal from the right channel 107 is communicated on the right channel wire 31 to a second tone decoder 86'. The signals from the detectors 86, 86' are provided to input terminals of a logical OR gate 169, the output signal of which is provided on line 69 to the mode switch 364 as representing the detection of the silent period 58 from either the left or right channel. The left and right channel audio signals are also provided directly to the mode switch 364 which selectively connects the left and right audio signals to the headphones 16, 17 when in the audio mode and to separate A/D converters 44, 44' when in the text mode. The text data in the left and right channels are separately converted from analog to digital and provided in parallel to the CPU 50. The CPU 50 then stores the data from the left channel and right channel A/D converters 44, 44' in the RAM 52 using parallel processing methods.

EMBODIMENT FOR CUE AND REVIEW CAPABILITY

Figure 10:
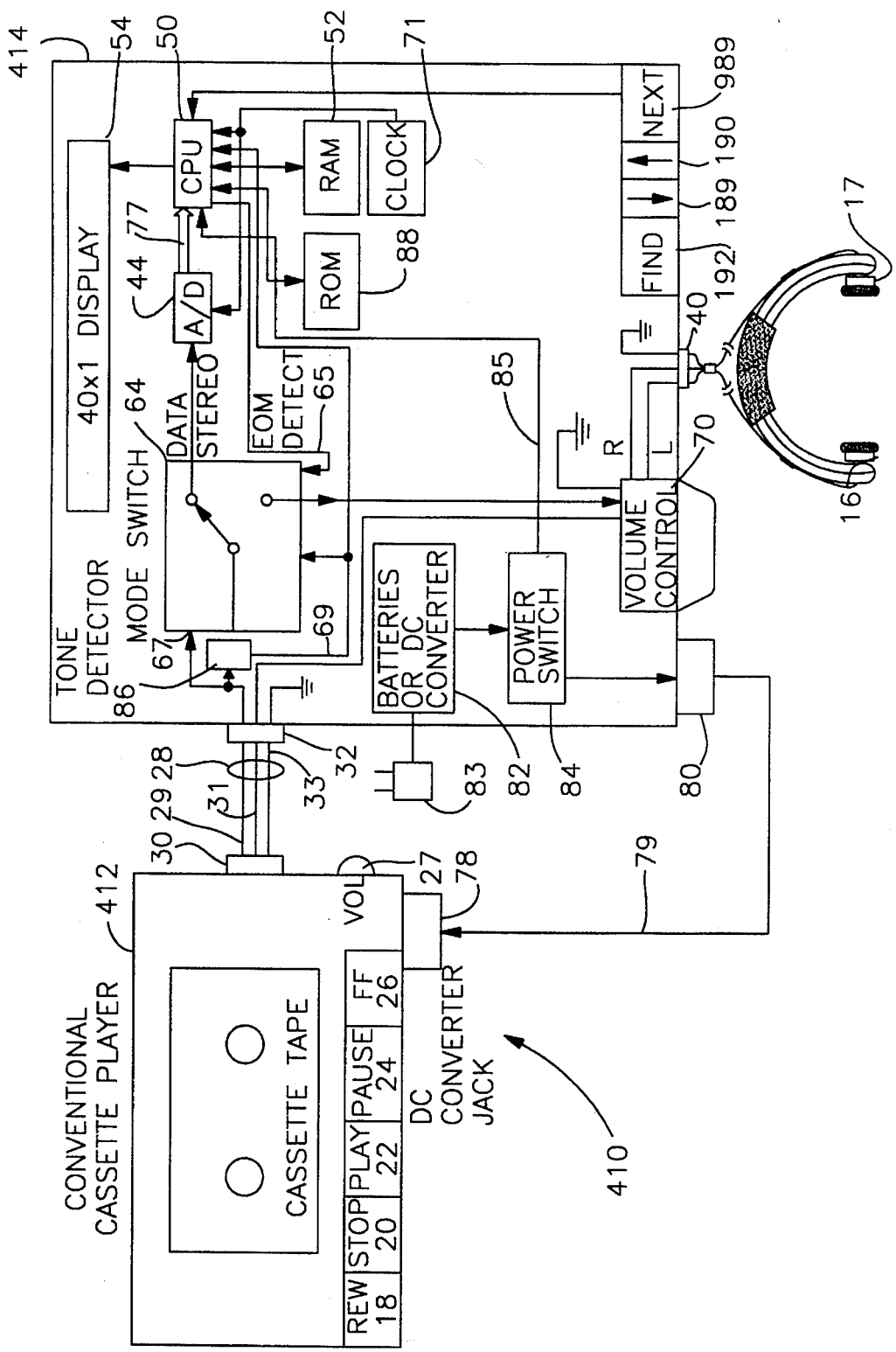
FIG. 10 is a functional block diagram of another embodiment of the adaptor of FIG. 3, showing the addition of an automatic stop feature for each audio selection using the adapter according to the principles of the invention.

FIG. 10 is a functional block diagram of another embodiment of the adapter of FIG. 3, showing the addition of an automatic stop feature for each audio selection using the adapter according to the principles of the invention.

Figure 11:
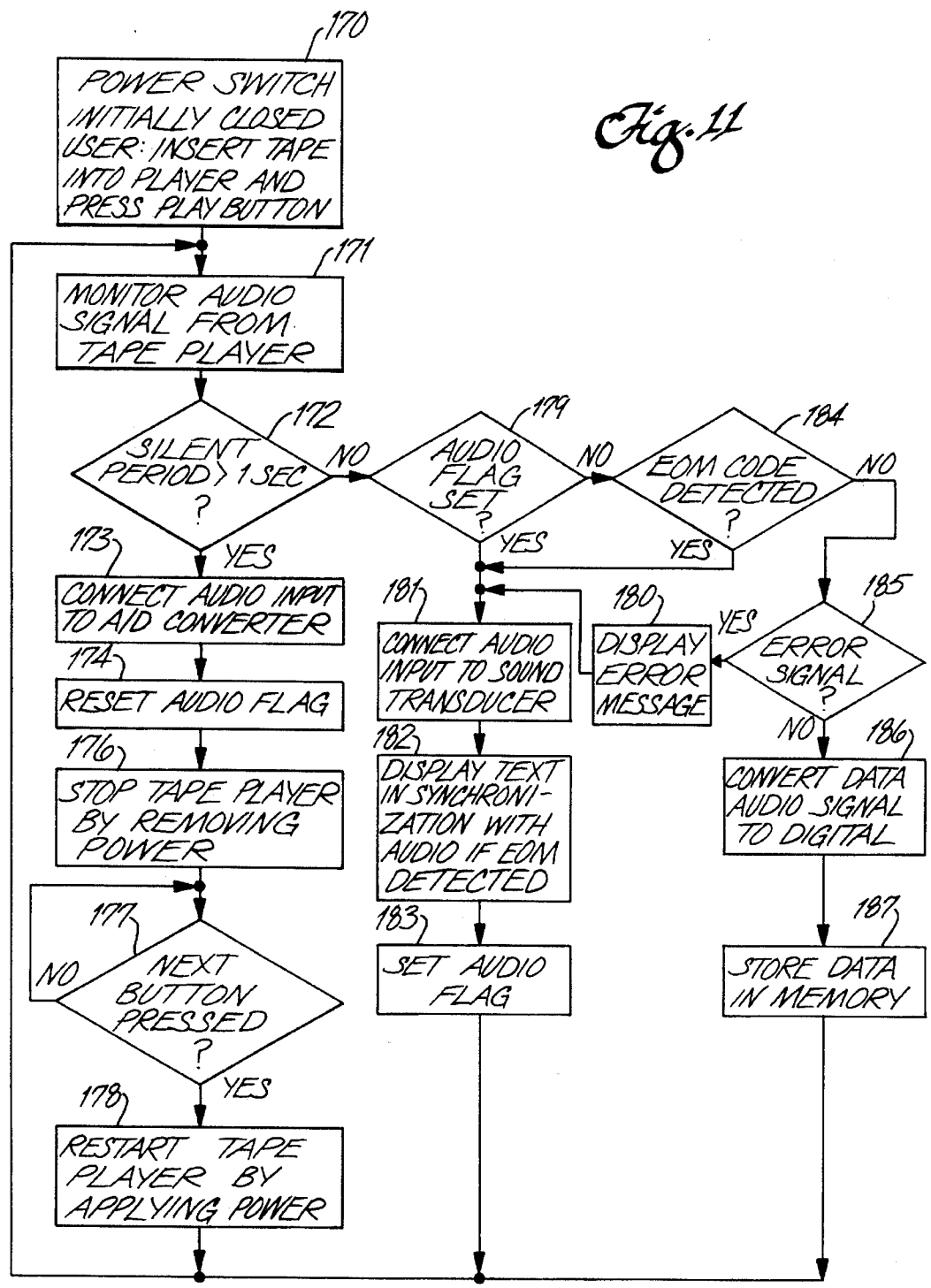
FIG. 11 is a flow chart showing the steps employed in the operation of the adapter of FIG. 10.

FIG. 11 is a flow chart showing the steps employed in the operation of the adapter of FIG. 11. Like elements in FIG. 10 have like reference numerals for like elements in FIGS. 1 and 3.

A system 410 comprises a cassette player 412, an adapter 414, and headphones 16, 17. The cassette player 412 is similar to the cassette player described above in FIG. 1, but it contains a DC-converter jack 78 electrically connected to a DC power converter output jack 80 on the adapter 414 by a suitable power cable 79. The converter jack 78 is provided on many tape players to power the player from an external AC source using a power converter. Inserting a plug in the jack 78 automatically disconnects the batteries in the player, which is then powered from an external supply. A power supply 82 in the adapter 414 provides power to a power switch 84 which is connected to the DC-converter jack 80. The power supply 82 may be batteries internal to the adapter 414 or a DC converter 83 for converting AC power to DC power for powering the system 410 and the player 412. The power switch 84 is controlled by a power-select command signal on line 85 from the CPU 50. The power switch 84 applies or removes power from the cassette player 412 in response to the power select command. A down arrow cursor key 189 and an up arrow cursor key 190 allow the user to command the CPU 50 to scroll through displays, and a search button 192 allows the user to conduct a search of the tape as will be described below.

With the structure of the system 410 now defined, the operation of the system is now described. As an overview of this system, the adapter 414 commands the tape player 412 to play segments of tape while displaying text data related to the audio in the segments. At the end of each segment, the adapter 414 commands the tape player 412 to stop play. After a user selected command, the adapter 414 commands the tape player 412 to play the next segment of tape.

Referring now to FIG. 11 for the details of the system operation, the listener first inserts a text plus audio tape into the tape player 412 and presses the play button 22 (Step 170). The power switch 84 is initially closed, providing power to the player 412. As the tape plays, the tone detector 86 monitors the audio signal from the tape player 212 (Step 171). Each time the tone detector 86 encounters a silent period 58 greater than one second on the audio signal (Step 172), the tone detector 86 sends a tone detect signal on line 69 to both the mode switch 64 and the CPU 50. In response to this signal, the mode switch 64 connects the audio signals to the analog-to-digital converter 44 as described above for the FIG. 3 (Step 173). The CPU 50 also resets an audio flag to indicate that the system 410 is in a text mode (Step 174). In addition, the CPU 50 commands the power switch 84 to remove power to the cassette player 412 (Step 176). In this manner, the cassette player 412, which is in the play mode, automatically stops at the end of each audio selection, whether it is a language phrase or a musical selection, as denoted by the silent period which precedes the text portion of the following selection. After the user presses a Next button 989 on the adapter 414 (Step 177), the CPU 50 sends a power-select signal on line 85 to the power switch 84 commanding it to restore power to the cassette player 412 (Step 178) until the next silent period 58 is encountered (Steps 171 and 172).

On the other hand, if a silent period greater than one second is not detected (Step 172), the CPU 50 checks whether the audio flag is set (Step 179). If the audio flag is not set, the adapter 414 is in the text mode and the CPU 50 determines whether an EOM code 62 is detected (Step 184). Unless an EOM code is detected, the CPU 50 performs an error analysis to determine whether the CPU is properly in the text mode in a manner similar to step 132 described above in FIG. 5 (Step 185). If an error is detected, the CPU 50 may display an error message (Step 180) and enters the audio mode described below for step 181. But if no error is detected, the A/D convertor 44 converts the data audio signal to digital data (Step 186) which the CPU 50 stores in the RAM52 (Step 187). The CPU 50 returns to monitoring the audio signal as described above (Step 171).

However, if either the audio flag is set (Step 179), an EOM code 62 is detected (Step 184), or the CPU is erroneously in the text mode (Step 185), the CPU 50 switches to the audio mode. The CPU 50 commands the mode switch 84 to communicate the audio signals to the headphones 16, 17 (Step 181) and to display the text in synchronization with the audio if an EOM signal has been detected, as described in detail in FIG. 5 (Step 182). The CPU 50 also sets the audio flag to indicate that it is in the audio mode (Step 183) and then returns to monitoring the audio signal (Step 171).

Note that this embodiment may be used with audio only tape (no text) which have selections separated by silent periods.

DIRECTORY SEARCHES USING CUE AND REVIEW

Figure 12:
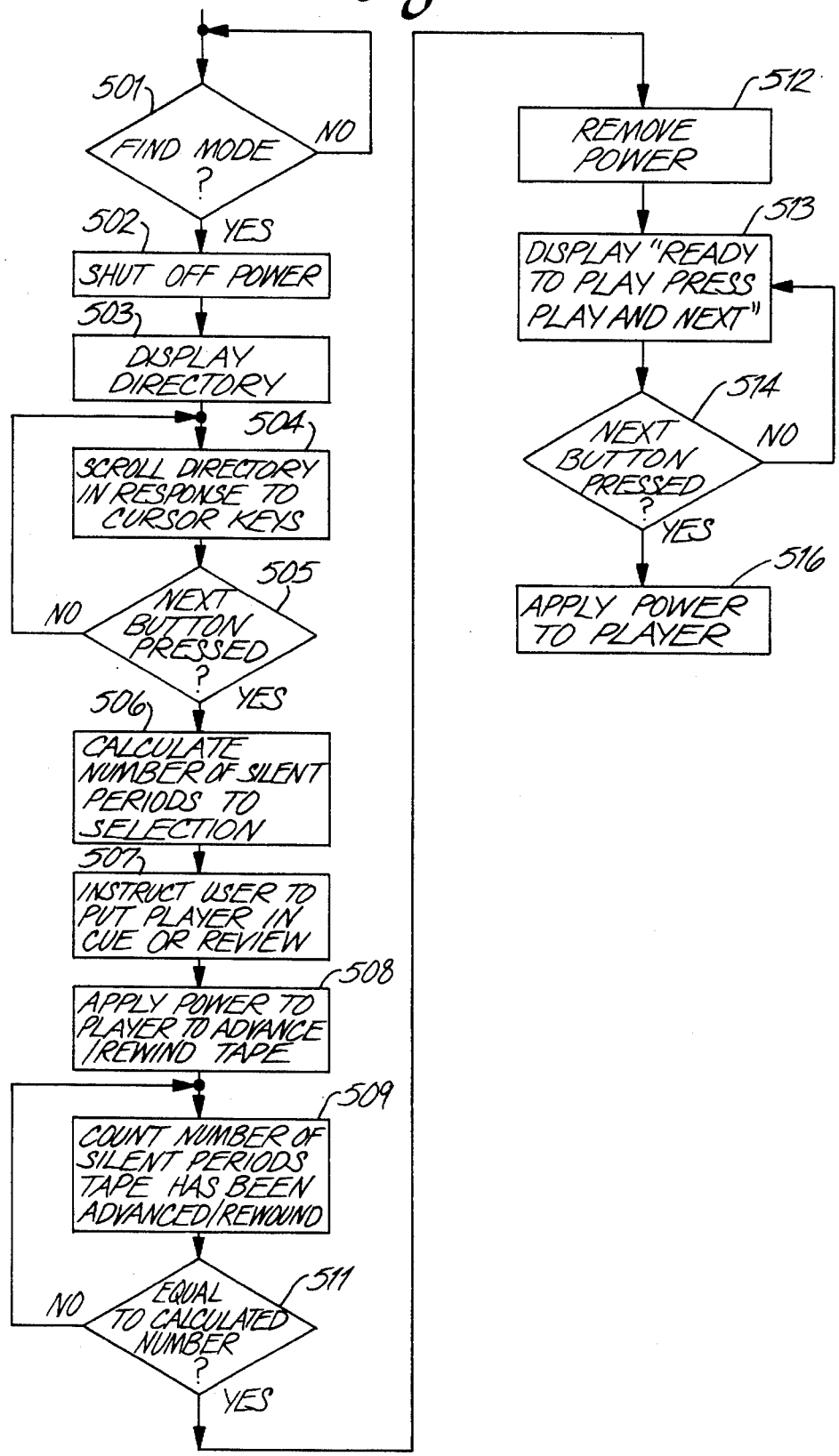
FIG. 12 is a flow chart showing the steps employed in a directory search of the tape feature using the adaptor shown in FIG. 10.

FIG. 12 is a flow chart showing the steps employed in a directory search of the tape feature using the adaptor shown in FIG. 10. In this alternate embodiment for the adapter shown in FIG. 10, a directory and auto search feature are provided. Some cassette players have fast forward and rewind search modes sometimes referred to as "cue" and "review" modes, respectively, where the magnetic tape remains in contact with the magnetic head, and the audio is not muted and continues to be provided to the audio output jack 30. With these players, a directory may be stored at the beginning of the tape as part of the text data 60. As the text data is being read, it is stored in the RAM 52. The directory contains an audio selection number corresponding to the sequential number of the audio selection on the tape for each side, title of selection, artist, album name and side and location on the tape.

Referring now to FIG. 12, the listener places the player in the cue mode, which is generally accomplished by simultaneously pushing the play key 22 and fast forward key 26 on the player 212, or in the review mode, which is generally accomplished by simultaneously pushing the play key 22 and the rewind key 18. The text plus audio tape is placed in the player 412, and rewound to the beginning of side A. If find mode is selected by pressing the find button 192 (Step 501), the CPU 50 commands the power switch 84 to remove power to the tape player (Step 502). The CPU 50 then reads the directory from the RAM 52 and sends it to the display 54 (Step 503). The user scrolls through the directory using the cursor keys 189, 190 until he makes his selection (Step 504) by pressing the next button 989 on the adapter 414 (Step 505). Alternatively, the adapter may have a numeric or QWERTY keyboard for moving through and making selections from the directory. The CPU 50 calculates the number of silent periods to the selection and the direction (Step 506) (based on the present position and the audio selection number). The CPU 50 then instructs the user to put the player in the cue mode to advance the tape (Step 506) or the review mode to rewind the tape (Step 507). The CPU 50 then commands the power switch 84 to apply power to the player to advance or rewind the tape depending on whether the player is in the cue or review mode, respectively (Step 508). The CPU 50 counts the number of silent periods that the tape has been advanced (Step 509), and when this number equals the calculated number of silent periods (Step 511), it stops the tape by commanding the power switch 84 to remove power to the player (Step 512). The CPU 50 then commands the display 54 to instruct the user that the tape is ready to play and to begin play the user must press the play button 22 on the player 412 and then the next button 989 on the adaptor 414 to inform the CPU 50 that the user has pressed the play button (Step 513). When the next button 88 is again pressed (Step 514), the adapter 414 again turns on the player 412 by commanding the power switch 84 to apply power to it (Step 516). The user now hears his selection along with text display. Thus, the adapter 414 counts the silent periods and automatically cuts power to the player, using the switch 84, when the selection is reached, and the listener then places the player in play mode and presses the Next button 989 to hear the selection.

ALTERNATE EMBODIMENT FOR AUTOMATIC SEARCH

Figure 13:
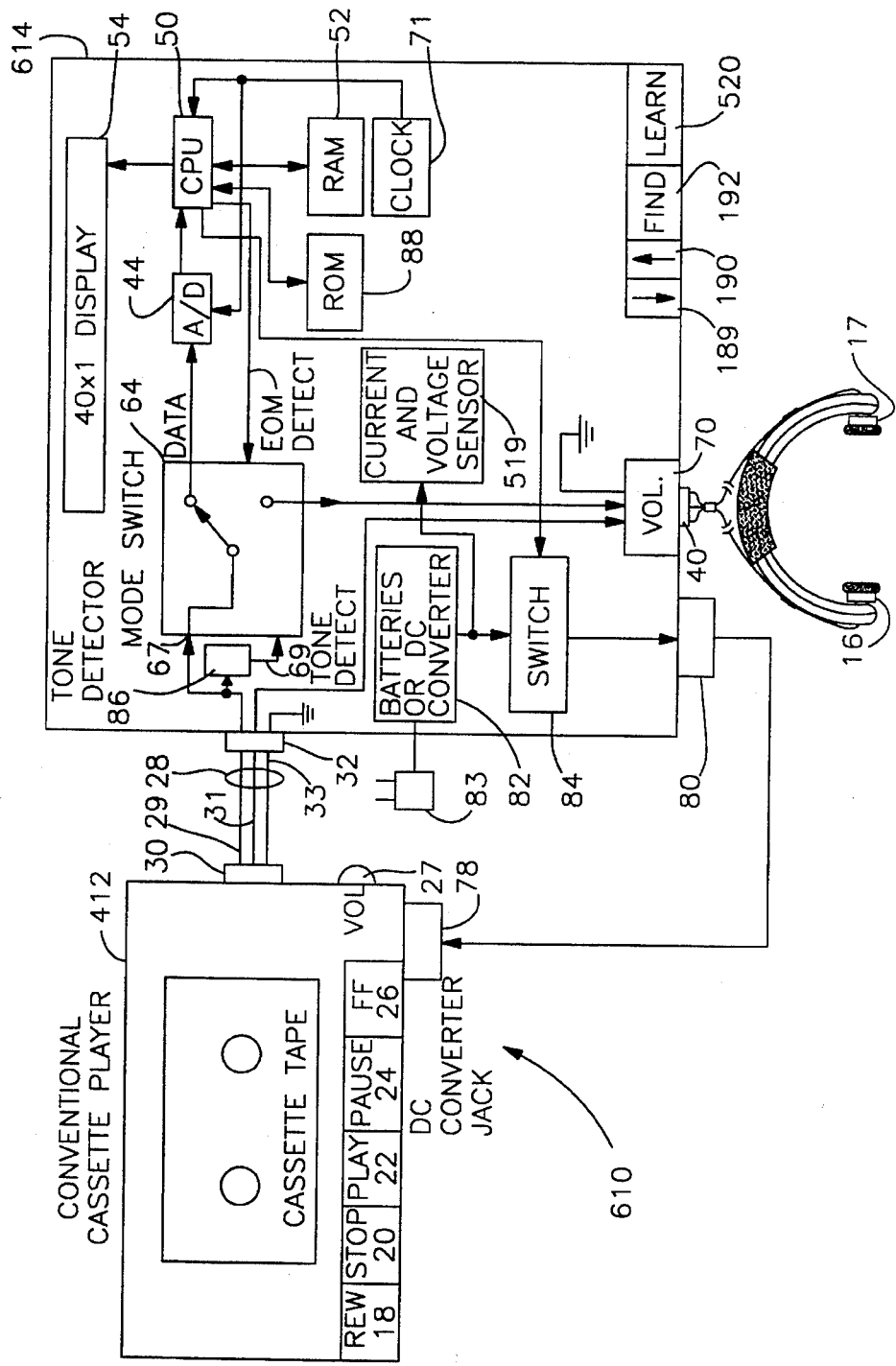
FIG. 13 is a functional block diagram of an alternate embodiment of the adapter of FIG. 10 for use with tape players without cue and review capability showing the feature of automatic search for audio selection according to the principles of the invention.
Figure 14:
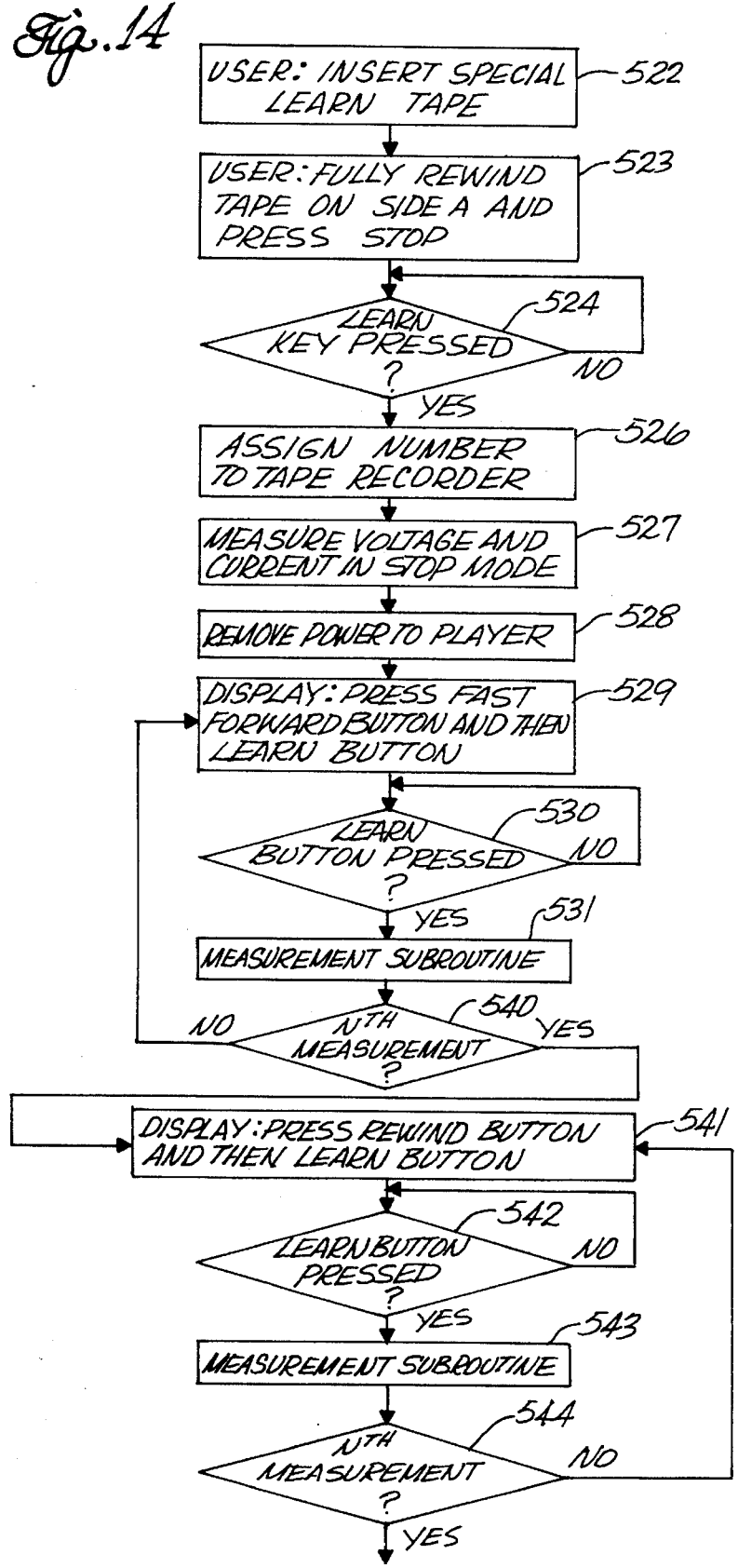
FIG. 14 is a flow chart showing the steps of the learn mode for learning the distance/time characteristics of the tape player shown in FIG. 13.
Figure 15:
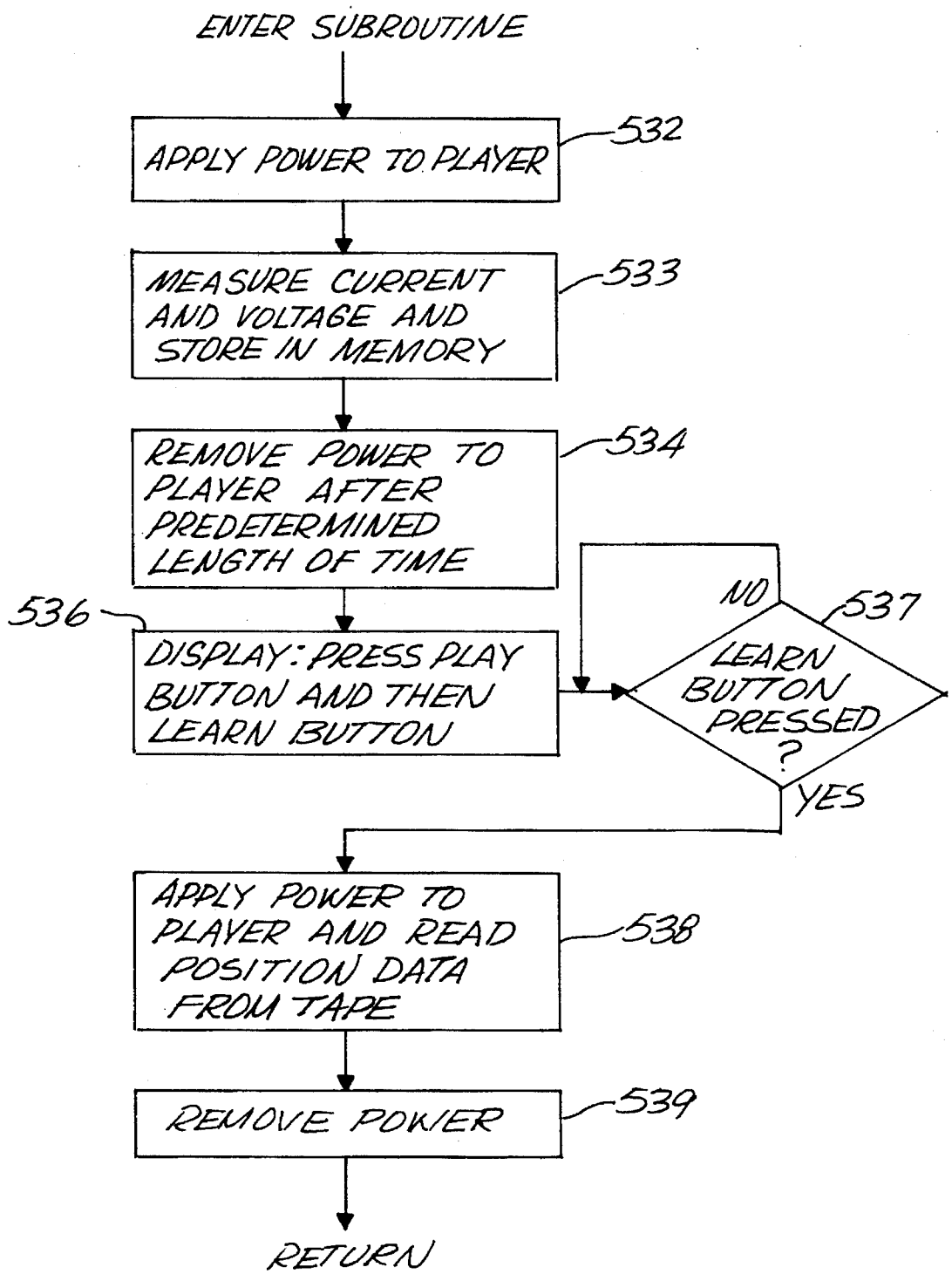
FIG. 15 is a flow chart showing the steps of a subroutine for controlling the tape player for the steps shown in FIG. 14.

FIG. 13 is a functional block diagram of an alternate embodiment of the adapter of FIG. 10 for use with tape players without cue and review capability showing the feature of automatic search for audio selection according to the principles of the invention. FIG. 14 is a flow chart showing the steps of the learn mode for learning the distance/time characteristics of the tape player shown in FIG. 13. FIG. 15 is a flow chart showing the steps of a subroutine for controlling the tape player for the steps shown in FIG. 14.

Like elements in FIG. 13 have like numbers for like elements in FIG. 10.

A system 610 is similar to the system 410 described above in FIG. 10 but it is capable of providing cue and automatic search capability for cassette tape players 412 that do not have a magnetic head in contact with the tape during rewind or fast forward. An adapter 614 is similar to the adapter 414 described above in FIG. 10, but the adapter 614 has a current/voltage sensor 519 that senses and measures the current and voltage drawn from the power supply 82 and communicates the measurements to the CPU 50. In addition, the adapter 614 differs from the adapter 414 by including a learn button 520 for implementing a learn mode in which the user commands the adapter in a mode for learning the rewind and fast forward tape speed characteristics of a particular tape player 412 operating in conjunction with a power supply 82.

In the learn mode, the adapter is taught the time versus distance characteristics for each of the user's tape players while in the rewind or fast forward modes. Once these characteristics are learned, they are used to position the tape at the correct location by open loop timing of the fast forward and rewind modes. This enables the user to fast forward or reverse to a particular selection on the magnetic tape in audio tape players which do not have a search feature as will be described below. Referring to FIG. 14, to teach the adapter 614 the fast forward and reverse speed characteristics of the tape player 414, the user inserts a special learn cassette tape into the tape player (Step 522). The learn tape, supplied with the adapter 614, has preferably a length matching the longest commercially available tape, for example, a 120 minute tape. Audio tones representing data corresponding to the position of the tape from the beginning of the tape are stored along the length of the tape and encoded for both sides A and B of the tape. The position corresponds to the position from each-end so that both sides A and B start from opposite ends of the magnetic tape.

To train the adapter 614, the user fully rewinds side A of the tape and presses the stop key on the tape player 412 thereby stopping further tape movement (Step 523). The user then presses the learn key 405 to instruct the CPU 50 to enter the learn mode (Step 524) and cause it to prompt the user by asking the user to assign a number to the particular tape player (Step 526). The adapter 614 has sufficient memory in a nonvolatile portion of the RAM 52 to allow the adapter sufficient memory to learn the speed characteristics of several of the user's tape players. The user then marks each player for later identification by placing numbered stickers thereon. The user will use this number to later identify the tape player when he listens to a tape. The user changes the displayed number by using the down arrow key 189 or the up arrow key 190 to decrement or increment the number on the display. After the user selects the player number, he again presses the learn key 520 (Step 526). The CPU 50 measures the current and voltage to the player as monitored by the current/voltage sensor 519 while the player is in the stop mode and stores this data in the RAM 52 (Step 527). The CPU 50 then removes power to the tape player (Step 528) and then displays an instruction to the user to place the tape player 412 in the fast forward mode by pressing the fast forward button and then press the learn button 520 (Step 530). After the learn button 520 is pressed (Step 530), the CPU 50 jumps into the measurement subroutine shown in FIG. 15 (Step 531). Alternately, the CPU may wait a predetermined length of time e.g., (5 seconds) before entering the subroutine at steps 529 and 530. In this alternative, it is presumed that the user has complied with the request of pressing the fast forward button. As another alternative, the CPU 50 may monitor the current and voltage measured by the current/voltage sensor 519 to detect the sudden increase in current that occurs when the tape starts.

Referring to the subroutine of FIG. 15, the CPU 50 energizes the tape player which is in the fast forward mode by commanding the power switch to apply power to the player (Step 532). While the tape is moving in fast forward, the current and voltage drawn by the tape player is periodically measured and stored in the RAM 52 (Step 533). The CPU 50 then removes power to the tape player after a predetermined length of time (Step 534). The predetermined length of time is preferably 15 seconds so that at least four measurements may be taken during the full fast forwarding of the tape that typically takes between 60 to 120 seconds on many commercially available cassette tape players. The CPU 50 then displays a command to the user to press the play button 22 and then the learn button 520 (Step 536). When the learn button 520 has been pressed (Step 537), the CPU reapplies power to the player 412 and reads the position data encoded on the learn tape and stores this data in the RAM52 (Step 538). From this data, the CPU 50 knows the position of the tape as a function of time during the fast forward mode over this particular tape segment. The CPU 50 again removes power to the tape player (Step 539) and exits the subroutine and returns to the flow chart of FIG. 14. Until the nth measurement is taken, the CPU 50 returns to step 529 (Step 540). Upon the nth measurement, the CPU 50 executes the learn mode for the rewind direction.

The CPU 50 displays a command to the user to press the rewind button 18 and then the learn button 520 (Step 541). When the learn button 520 is pressed (Step 542), the CPU 50 jumps to the subroutine described above for FIG. 15 (Step 543) to perform the measurement of current voltage position as a function of time. Until the nth measurement in the rewind direction is taken, the CPU 50 returns to step 541 (Step 544). Upon completion of the nth measurement in the rewind direction, the CPU 50 has completed its training and has stored in the RAM 52 a table of time v. tape positions in both the rewind and fast forward modes along with the voltage and current characteristics, which are predominantly take-up motor current. The CPU 50 is then able to use this characteristic table to interpolate tape position as a function of time with minor empirically determined error corrections for subsequent changes in motor current and battery condition.

Figure 16:
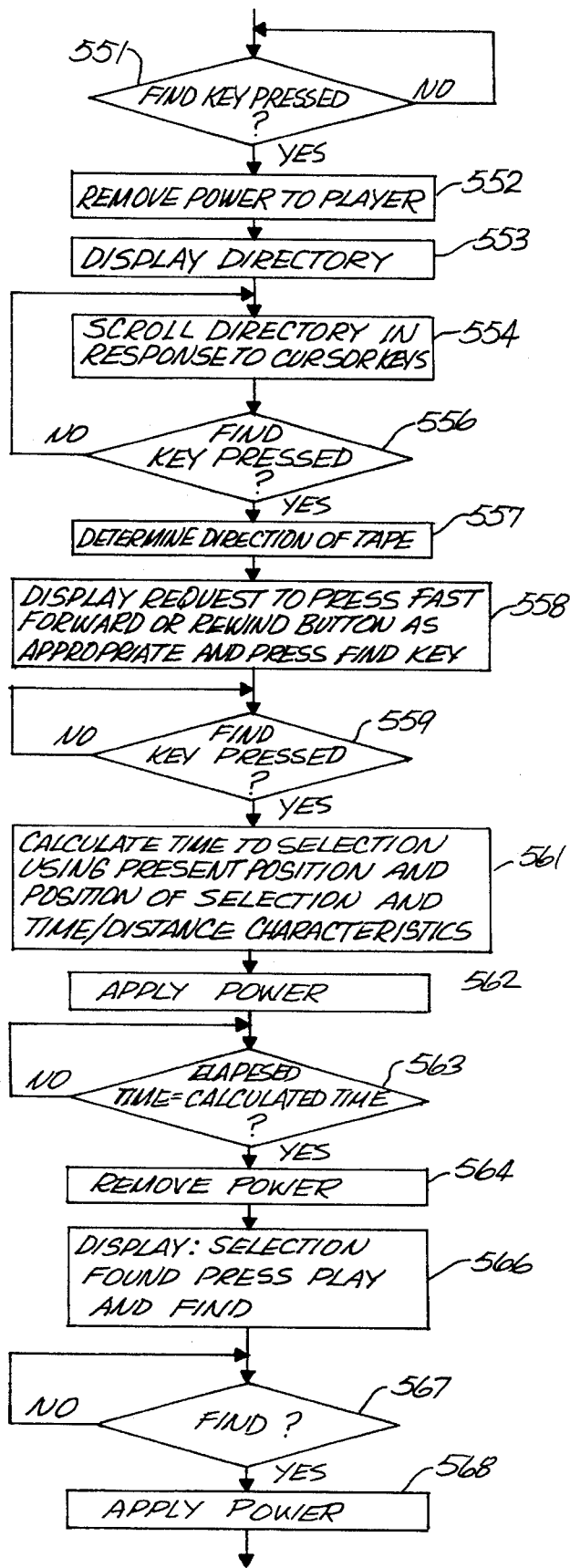
FIG. 16 is a flow chart showing the steps employed in finding a selection using the adapter shown in FIG. 13.

FIG. 16 is a flow chart showing the steps employed in finding a selection using the adapter shown in FIG. 13. In the find mode, the user is able to perform automatic program searches after the adapter has been trained as described above. The data encoded in a text plus audio tape for use in this embodiment includes directory information such as the total length of the tape, the position (say in inches) from the beginning of the tape to the start of each selection on the tape, the present position of the tape and the title and sequence number for each selection. This data may be repeated at the beginning of each audio selection. After the user has inserted an audio data tape into the tape player 412, the adapter 614 reads and stores the directory in the manner described above for reading text data in FIG. 10. With the tape player 412 in the stop mode, when the user presses the find key 192 (Step 551), the CPU 50 removes power to the tape player 412 (Step 551) and displays the directory (Step 553). The user makes a selection using the down arrow key 189 or the up arrow key 190 (Step 554). Actuating these keys causes the titles of the selections to be displayed in sequence on the screen. In addition, titles on the other side of the tape are also displayed. When the user finds a program of interest, he again actuates the find key 192 (Step 556). The CPU 50 then uses the present location data and the location of the selection read in the directory to determine the direction to move the tape (Step 557). The CPU 50 then prompts the user to actuate either the fast forward key 26 or rewind key 18 on the tape player 412 depending upon whether the selection is ahead or behind the present tape position and then to again press the find key 192 (Step 558).

After the find key 192 is pressed (Step 559), the CPU 50 calculates the distance to the selection from the present position using the directory information read from the tape and applies this distance calculation to the interpolated time/distance characteristics learned during the learn mode to calculate a time to bring the tape to the starting point of the selection (Step 561). To allow for deceleration a small amount of time is either added to in the rewind mode or subtracted from in the fast forward mode the calculated time to ensure that the tape stops before it reaches the beginning of the selection. The CPU 50 then reapplies power to the player 412 (Step 562). After the elapsed time after applying power equals the calculated time to the selection (Step 563), the CPU 50 removes power to the tape player (Step 564).

In an alternate embodiment to a find key initiation, when the user activates the fast forward or rewind mode, the current/voltage sensor 519 detects a sudden change in current. In response, the CPU 50 automatically starts timing the elapsed time and removes power from the tape player after the prescribed time. During this time, the CPU 50 continues to monitor the voltage and current level and if the motor current or voltage is different from that stored within the learn data, the prescribed time is adjusted.

Returning to the first alternative, the CPU 50 prompts the user by either screen display or a beeper sound on the headphones 16, 17 to put the tape player in the play mode and again press the find key 192 (Step 566). Upon the user entering another find command (Step 567), the CPU 50 applies power to the tape player which begins playing the user's selection (Step 568).

In another embodiment, the CPU 50 automatically determines that the user complied with the play prompt by monitoring and sensing a change in the impedance appearing across the DC converter jack 78. The impedance measurement is made by applying a very low measuring voltage to the tape player which is sufficiently low so that the motor does not move, and measures the current. If a change in impedance is detected, power is automatically applied to the player. In yet another embodiment, after the user places the player in the play mode and the CPU 50 commands the adapter to apply power to the tape player, there is preferably a short interval of time from the stop position to the actual start of the desired selection, which is detected by the silent period described above. The CPU 50 measures this interval of time in the play mode and calculates the corresponding time interval in fast forward or rewind. This interval is then used as an adaptive error correction factor applied to the stored time/distance characteristics, whereby subsequent find requests will bring the tape even closer to the desired start position. Note that the embodiments shown in FIGS. 10 and 13 may employ the left and right channel text storage and retrieval system shown in FIG. 8.

EMBODIMENT FOR AUDIO SOURCE WITH INTEGRALLY CONNECTED SPEAKERS

Figure 17:
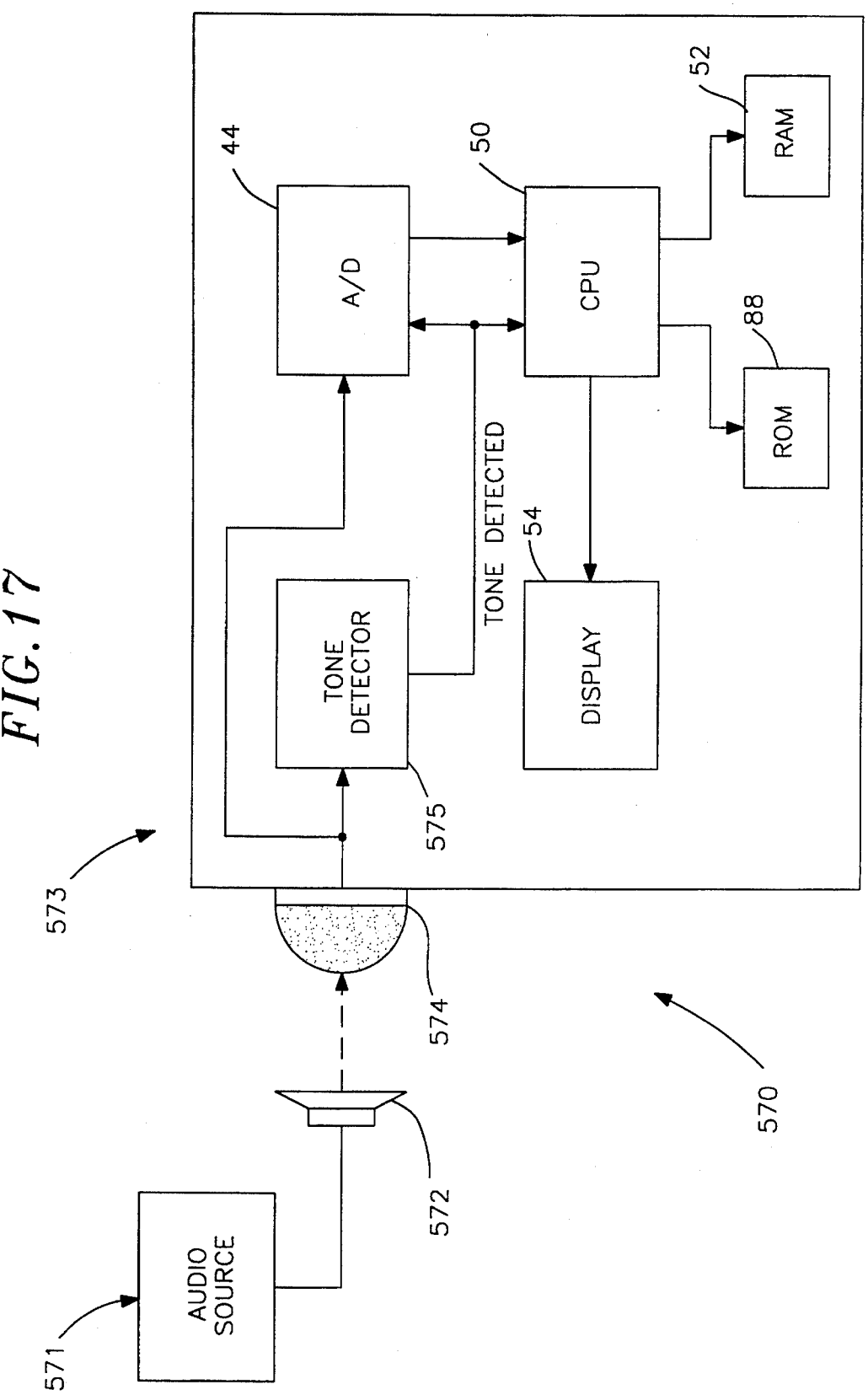
FIG. 17 is a functional block diagram of an adapter for displaying text data detected from audio tones transmitted from speakers.

FIG. 17 is a functional block diagram of an adapter for displaying text data detected from audio tones transmitted from speakers.

The system 570 is comprised of an audio source 571, speakers 572, and an adapter 573. In this embodiment the adapter 573 is not electrically connected to the audio source 571. This embodiment is useful for car radios, unified stereos, and other systems where it is not convenient to electrically tap into the audio output circuits. The audio source may be a cassette player, AM or FM radio, CD player or television. The audio tones are communicated from the audio source 571 to the speakers 572 and broadcast as sound which is picked up by a microphone 574 on the adapter 573. The microphone 574 provides the detected audio tones to a tone detector 575 that, when a text data tone is detected, sends a detection signal on line 576 to the CPU 50 and the A/D converter 44. When text data is detected, the A/D converter 44 converts the detected tones into digital data which is processed by the CPU 50 and stored in the RAM 52 in a manner similar to the embodiments described above. By using a predetermined synchronization signal at the beginning of the audio, the CPU 50 can determine the beginning of the audio signal when the text data is transmitted in a burst mode. Alternatively, the text data may be transmitted concurrently with the audio signals using left and right stereo channels, respectively. In a manner similar to the embodiments described above, the CPU outputs the text data to the display 54 in synchronization with the audio signals. In this embodiment a silent period is not used to signify the start of the data, but a unique tone or tones sequence such as a header is used to signify the incoming data.

CD PLAYER EMBODIMENT

Figure 18:
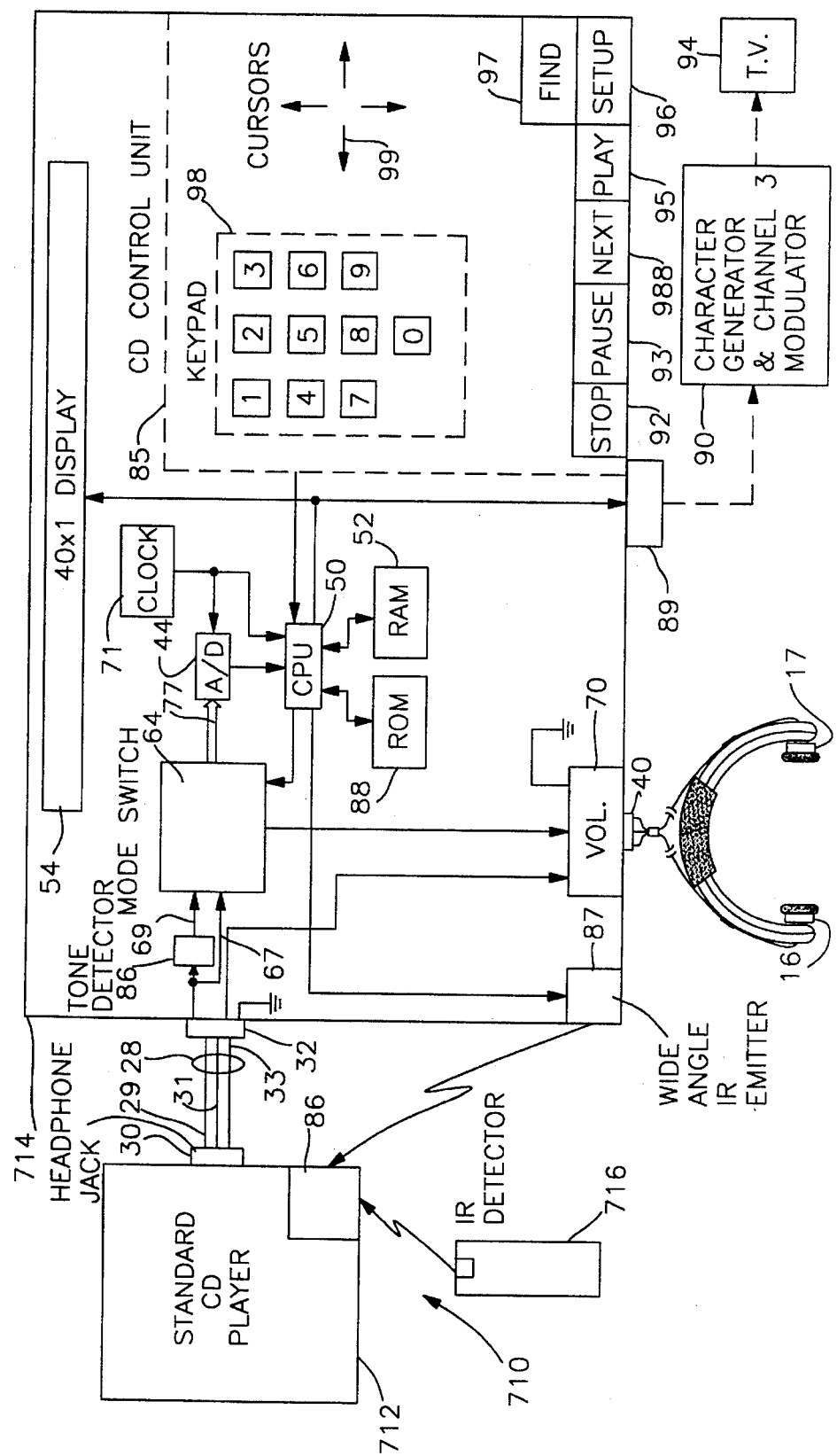
FIG. 18 is a functional block diagram showing an adapter for use while playing, on a standard compact disk (CD) player, a CD having text recorded on the CD.

FIG. 18 is a functional block diagram showing an adapter for use while playing, on a standard compact disk (CD) player, a CD having text recorded on the CD. FIG. 19 is a flow chart showing the steps employed in the operation of the adaptor in FIG. 18. Like elements in FIG. 18 have like numbers for like elements in FIG. 3.

A system 710 comprises a compact disk (CD) player 712, an adapter 714, headphones 16, 17, and a video processor 90. The compact disk player 712 (also referred to as a CD player) is a standard CD player that plays compact disks in a manner well-known to those skilled in the art.

For a text plus audio CD, the audio text tones may be recorded preceding each audio selection in the same track, separated by an EOM signal. Alternatively, the audio selections are preferably recorded in tracks on the CD that are consecutively numbered. For example, 12 songs are recorded on a CD in tracks 1 through 12. The data tones corresponding to these songs (or other audio selections) are recorded in tracks which follow the last audio selection and are also consecutively numbered. Thus, for the same example, the data for song tracks 1 through 12 are recorded in tracks 13 through 24, respectively. To play back the CD on a CD player without using an adapter 714, the data tracks may be avoided by stopping the CD player at the end of the last audio selection (track 12 in the above example).

In yet another alternate embodiment of the text plus audio CD, the data is recorded in a separate track preceding the audio track to which the data track relates. Thus, track 1 contains the data for track 2, track 3 contains the data for track 4, etc. To playback the CD on a CD player without using an adapter 714, the data tracks may be avoided by programming the CD player 714 to play only the even tracks on the CD (in the example, play only tracks 2, 4 . . . ) Accordingly, the listener hears only the audio.

If the CD player 712 is one which is equipped with an infrared (IR) remote control system, the player 712 may be automatically controlled by the adapter 714 to sequence the text and audio tracks for any text plus audio CD track format. The CD player 712 has an infrared (IR) detector 86 that receives infrared signals from a corresponding CD remote IR transmitter 716 that correspond to CD player control commands which are well-known to those skilled in the art. By pressing buttons or keys on the CD remote transmitter 716, the user may select different control operations that are converted to infrared signals and transmitted to the CD player 712 through a corresponding IR emitter on the CD player remote transmitter 716. The adapter 714 similarly has a wide angle infrared emitter 87 that transmits IR command signals for controlling the player 712, over a wide area. In embodiments of the adaptor for tape players, radio, television, or other audio producing electronics, the electronic device may be similarly operated by IR remote control.

A CD control unit 85 on the adapter 714 allows a user to input user selected commands to the CD player 712 in a manner similar to that of the CD player remote transmitter 716. In particular, the user selects commands by pressing keys or buttons on the CD control unit 85, which sends a corresponding control signal to the CPU 50. A stop key 92 commands the CD player 712 to stop playing the CD. A pause key 93 commands the CD player 712 to continue rotating the disk and to keep track of its location on the disk, but to stop outputting audio signals to the adapter. A Next key 988 commands the CD player 712 to restart and play the next segment of vocal for an instructional CD in a manner similar to that described above for FIG. 4. A play key 95 commands the CD player 712 to start playing music. A setup key 96 allows the user to input information about the CD player 712. The keypad 98 has separate keys corresponding to the numbers 0–9. Alternatively, the user may enter commands using cursor keys 99 for controlling the movement of a cursor on the display 54 or on a TV 94 as described below. A find key 97 allows the user to locate audio tracks from data stored in the RAM 52 as will be described below. Alternatively, a mouse, joy stick or ball may be used to control cursor movement.

The adapter 714 has stored in a read-only memory (ROM) 88, the IR codes protocols for most commercially available CD players indexed by manufacturer and model number. During a setup mode, which is initiated by pressing the setup key 96, the user identifies his CD player 712 by manufacturer and model number. When the user identifies his CD player by entering an identification number or by selecting from a menu on the display 54, the CPU 50 stores the number in a non-volatile portion of RAM 52, such as battery back up RAM, or EEPROM, so that each time the adapter 714 is subsequently powered up, the CPU 50 retrieves the correct IR code protocol. Alternatively, the adapter 714 may have a learn function that allows the adapter to monitor the IR transmissions from the CD player remote transmitter and store them in a nonvolatile memory for later recall. When the control keys of the control unit 85 on the adapter 714 are actuated, the CPU 50 reads the corresponding monitored signal from the memory and commands the IR emitter 87 to transmit an IR signal in the proper protocol that is reconstructed from the stored signal.

The structure of the adapter 714 is similar to that for adapter 214 described above in FIG. 3. The CD player 712 is connected to the adapter 714 by a cable 28 between an audio output connector 30 on the CD player and an audio input connector 32 on the adapter in a manner similar to that described above for FIG. 1. Internal to the adapter 714, the left channel audio cable 29 is connected to a tone detector 86 that selectively commands a mode switch 64 to provide the audio input signals to either an analog-to-digital converter 44 or to a volume controller 70. The output of the volume controller 70 is communicated through an audio output connector 40 to the headphones 16, 17. The CPU 50 stores the digitized data from the analog-to-digital converter 44 in the RAM 52. During system operation, the CPU 50 generates display data by processing the digitized data and provides it to either a display 54 or to a display output connector 89. The display data output is communicated through the display output connector 89 to a video processor 90 which converts the display data into video text images by using a character generator and a video modulator in a manner well known in the art. The video modulator preferably generates a text signal on channel 3 that is displayed on a TV 94.

With the structure of the system 710 now defined, the operation of the system is now described. Referring to FIG. 19, the listener inserts a text plus audio CD into the CD player 712 (Step 580). The CPU 50 displays a request either on the display 54 or on the TV 94 requesting that the listener enter the last track number N of the audio track on the CD (Step 581) (FIG. 19 describes the preferred embodiment of a text plus audio CD where the text data is recorded in tracks after all the audio signals are recorded in tracks.) The user then selects M track numbers in the order to be played ($T_1T_2 \ldots T_i \ldots T_m$) (Step 582). The user then controls the playing of the CD player 712 by pressing the play button 95 on the adapter 714 (Step 583). Once the play button 95 is pressed, the adapter 714 assumes control of the CD player 712 and switches the mode switch 64 to the data mode thereby connecting the audio signals from the CD player to the A/D converter 44 (Step 584). The CPU 50 reads the IR code protocol for a play command from the ROM 88 and transmits a play command to the CD player 712 to play data track $T_i+N$ by transmitting the IR code from the IR emitter 87 (Step 586). The CPU 50 then starts the system timer by monitoring the signal from the clock 71 (Step 587). The CPU 50 then detects data signals (including text, text-timing, information text and audio track time length) from the audio signals being played from the data track $T_i+N$, and the A/D converter 44 converts the signals to a digital data format (Step 588). The digital data is then stored in the RAM 52 (Step 589). This process continues until the system timer equals the data track length read as part of the data signal (Step 591). At this time, the CD player 712 has completed playing the data track (which the adapter 714 now knows is completed), and begins the audio mode by switching the mode switch 64 to connect the audio signals from the CD player to the volume controller 70 (Step 592). To begin play of the audio track, the CPU 50 commands the wide angle IR emitter 87 to transmit the IR play command for audio track $T_i$ (Step 593). Each audio selection begins with a start data tone which causes the CPU 50 to again start the system timer by monitoring the clock signals from the clock 71 (Step 594). When the system timer equals the time for the next line or phrase (Step 596), the CPU 50 reads the corresponding text from the RAM 52 and displays the next line or phrase either on the display 54 or on the television 94 (Step 597). The details of the operation of the CD player for timing the playing of the audio signals with the text data is identical to that described above for the cassette player in FIGS. 3–6. When the system timer equals the audio track length, the CD player 712 has completed playing the audio track $T_i$ (Step 598). The CPU 50 then determines whether the track $T_i$ that has just been played is track $T_m$ which is the last track in the selected sequence (Step 599). If the track is not the last track, the CPU 50 returns to the step 584 to begin the process for the next track. Otherwise, the CPU 50 has completed playing the selected tracks and sends a stop command to the CD player 712 (Step 601).

In an alternate embodiment, the adapter 714 maintains a catalog of all songs in the users library indexed by CD tape or laser disk volume number so that the user can quickly find the desired song. In the preferred embodiment, the CDs, cassette tapes, or laser disks includes the song titles, the track numbers, a unique identification number, such as an ISBN number used to catalog books, and artists names in the data recorded therein. When the CD is played, the CPU 50 reads the unique volume number and compares it to stored ID numbers in a nonvolatile memory, such as battery backup RAM, or EEPROM and if the unique volume number is not presently stored in memory, the CPU stores the song titles, track numbers and artist name in the memory. Thus, each time a new CD is played, the adapter 714 automatically catalogs the CD. Alternatively, the user may manually enter the data by using the CD control unit 85.

The library feature is activated by the user pressing the find key 97 and using the cursor control keys 99 to scan through the library and make user selections. Alternatively, the user may perform an alpha-numeric search by toggling characters using the left and right arrow cursor keys to change the number of the character and use the up-down cursor keys to toggle through the letters. When the user has entered the name of the song, the artist or disk number depresses the find key 97 again and the CPU 50 searches the RAM 52 for a match and displays the selected volume number and track for that match. Alternatively, a standard QWERTY keyboard may be used or the keypad may have letters assigned to them as in a telephone for entering alphabetic characters.

RADIO EMBODIMENT

FIG. 20 is a functional block diagram showing an adaptor constructed in accordance with the present invention for use with a standard AM or FM radio receiver for receiving broadcasted text recorded as audio tones along with the audio radio broadcast. FIG. 21 is a schematic showing the timing format of the broadcast text data and the audio signals for the adaptor shown in FIG. 20. FIG. 22 is a schematic showing an alternate timing format of the broadcast text data and the audio signals for the adaptor shown in FIG. 20.

Referring to FIG. 20, the system 810 comprises a radio receiver 812, an adaptor 814, and headphones 16, 17. The radio receiver 812 is a conventional receiver which may be used to receive the stereophonic audio broadcasts as well as digital encoded message signals transmitted therewith by a remote radio transmitter system (not shown). The digital encoded message signals contain the musical selection identifying data, preferably in the form of the title, artist and album name relating to that selection. The message may also include advertising information including coupons or contest entries. The radio receiver may be either an AM receiver, an FM receiver, or a combined AM/FM receiver. The radio receiver is well known to those skilled in the art. Alternatively, the radio receiver may be a television receiver.

It will be appreciated that the text plus audio tapes and CDs recorded with the recording formats described above in connection with the embodiments of FIGS. 1, 3, 8, 10, 13, and 18 may be played over a broadcast station without modification, and an adapter constructed in accordance with the invention which is connected to an audio output jack of a suitable receiver will properly receive and display the text information in conjunction with the audio. In the following discussion, additional uses of the text plus audio concept in connection with broadcast applications will be disclosed. Referring to FIG. 21, one format of the transmitted message signals is now described. In this format, the text message is transmitted during an interval of silence immediately preceding or following the musical selection to be identified or alternatively immediately preceding a group of musical selections. This also avoids the potential for broadcasting a phrase after it should have been highlighted. Further, using this method alleviates any concerns, whether valid or not, that the transmission of data audio tones during the broadcast affects the fidelity of the music being broadcast. For example, if the radio station was having a karaoke hour, the data tones could be broadcast in bursts during that hour. Listeners without adapters would be advised not to listen during this time. The data tones would then be stored in the RAM 52.

At time $t_0$, the remote transmitter system broadcasts a start-of-message (SOM) code as audio tones or as a silent period. After completing this message, the text is broadcast as audio tones during time $t_1$ through $t_2$. An end-of-message (EOM) code is broadcast as audio tones during time $t_2$ through $t_3$. Following the EOM code, the audio signals are broadcast from $t_3$ to $t_4$. This process is repeated for subsequent audio selections. The data tones may be superimposed on top of pleasant audio tones in an effort to mask the data tone sounds or the data tones may be broadcast on one stereo channel (say the left), while "masking audio" is broadcasting the other channel, as described above for the previous embodiments.

FIG. 22 shows an alternate format for the transmitted message signals. In this format, the text message is transmitted during the time the corresponding musical selection is being transmitted, where the message transmission begins at about the same time as the musical selection transmission begins. Using this format, the data tones are superimposed on top of the music/speech currently being broadcast. At time $T_0$, the remote transmitter system simultaneously starts broadcasting both the audio signals and the text data using the two stereo channels. For purposes of this discussion, the audio and the text data will be in the right and left channels, respectively. However, the invention is not so limited. Between times $T_0$ and $T_3$, the remote transmitting station broadcasts the first audio signal in the right channel. Between time $T_0$ and $T_1$, a start-of-message (SOM) code is broadcast as audio tones in the left channel. After completing this message, the text is broadcast as audio tones in the left channel during time $T_1$ through $T_2$. An end-of-message (EOM) code is broadcast as audio tones in the left channel during time $T_2$ through $T_3$. This process is repeated for the next and subsequent audio selections. This format may only be used for a stereo radio system.

Referring back to FIG. 20, the left channel audio signals on wire 29 from the radio 812 are communicated to a tone detector 86 which generates a tone detect command to command a mode switch 64 to provide the signals to either an A/D convertor 44 or a volume controller 70 in response to an SOM code. The right channel audio signals on wire 31 are communicated directly to the volume controller 70. In a manner similar to the adapters described above, a CPU 50 receives digital data from the A/D convertor 44, commands from a delete button 818, a recall button 820, and a store button 822 and data from a ROM 88 and a RAM 52. The CPU 50 provides display commands and data to a display 54 and control commands to a beep tone generator 816 which provides audio tones to the left channel wire 817 to the volume controller 70.

The adaptor 810 operates in a manner similar to that of the adapters described above. In particular, for the data format shown in FIG. 21, when a SOM code is received, the tone detector 84 commands the mode switch 64 to provide the audio signals to the A/D convertor 44. The text data, which is transmitted following the SOM code, is converted into digital data by the A/D convertor 44 which the CPU 50 stores in the RAM 52. When an EOM code is detected, the CPU 50 commands the mode switch to provide the left channel audio signal to the volume controller 70. The CPU 50 processes the digital data to display the text in concurrence with the audio. The CPU 50 uses the EOM code as a time reference for the timing of the display.

As described above, the text data may be information related to the audio selection such as lyrics or title to or artist of songs, or advertisements. Further, it may be seen from the above description that the adaptor 814 displays to the user a message identifying a musical selection broadcast and reproduced by the headphones 16, 17 substantially concurrent therewith. One limitation in the system 810 as described above is that the user must observe the display 54 during the reception of the musical selection associated therewith in order to note the identifying information. First, this limitation poses a problem in automobile radios, where such action disrupts the driver's attention. Second, this limitation requires that the user remember or note in writing the identifying information if the intention is to purchase at a later time the album containing that selection.

This limitation is overcome in the present invention by providing a fixed storage function for storing selected messages for recall at a later time in response to user action. Thus, a Store button 822 is provided on the adaptor 814, the actuation of which provides a store signal on line 823 to the CPU 50. In response to this signal, the CPU 50 stores the displayed message in a non-volatile portion of the RAM 52 for later recall by the user. Multiple messages may be saved in this manner by multiple actuations of the Store button 822. Alternatively, additional control keys may be added on the controller such as a key pad 85 as described above for the CD player in FIG. 18.

To recall a particular message at a later time, the user actuates the RECALL button 820 on the adaptor 814 which provides a recall signal on line 821 to the CPU 50. In response, the CPU 50 recalls the selected message previously stored in the RAM 52, and displays that message on the display 54. The user is able to scroll through the stored messages using the cursor keys 189, 190.

Such stored messages may be repeatedly recalled until deleted by the user. Deletion is accomplished by actuation of the delete button 818 on the adaptor 814. This action causes the CPU 50, in response to a delete signal provided on line 819, to delete from the RAM 52 the selected message.

An audio reminder tone can be provided by the beep tone generator 816, in response to commands from the CPU 50, to alert the user that new messages are appearing on the display. For example, an advertiser may use the beep to indicate to the user that if he stores the advertisement in the adaptor, he can take his portable adaptor to a retail outlet to purchase the advertised item for an advertised price. In addition, a suitable switching arrangement (not shown) can be implemented to suppress the display of incoming messages during the time when previously stored messages are being recalled.

In order to pay for the cost of broadcasting lyric data, radio stations may sell time on the text display system to advertisers. Thus, an advertiser can have a standard audio commercial spoken over the radio while simultaneously having critical information such as the advertiser's name, phone numbers and addresses displayed on the lyric display. In order to make the display of this information most useful to the listener, the listener may temporarily store advertising information in the RAM 52 using the store button 822. The listener stores, retrieves or deletes advertising information using either the Store button 822, the recall key 820, or the delete key 818.

Advertising information or other stored text data can also be provided to a printer through a printer port 828 when it is received or after being recalled from the RAM 52 by sending print commands over an I/O interface 826 to the CPU 50. Alternatively, the I/O interface 826 may be used for downloading stored information directly to an external system.

The advertising may be coupons which may be redeemed at stores. As described above, the user stores the advertising messages in the RAM 52 for later recall. Alternatively, the advertising information may be used for contests by the radio station broadcasting an encoded message during a time interval only one of which has a winning number or word. Using the Store button 822, the listener tries to capture the correct code, which is announced at the end of the day. If the correct code is stored, the listener can collect a prize by taking his adaptor to a retailer for his gift. Security features such as encryption may be required to prevent fraud.

The audio tones can be used to set the time for the adaptor. In particular, the remote transmitting station transmits date and time tones at periodic intervals, such as once per hour. After conversion by the A/D convertor 44, the CPU 50 processes the time data and resets the system clock 71. The correct time can be provided to other consumer electronics, such as VCRs and VCR Plus+ programming controllers, through the I/O interface 826.

The broadcast information may be channel maps for a VCR Plus+ programming controller. The channel map is a table of local TV stations correlated to a table of channel numbers used by the VCR Plus+programming controller to control the command channel number on the VCR or a cable box in response to a user entering PlusCode numbers into the programming controller.

In another embodiment, the broadcast information are the PlusCode numbers used for programming the VCR Plus+ programming controller.

It is the intent that all text data be encrypted and scrambled. Thus, it is necessary that the adapters described herein includes means for descrambling and deencryptingo While there have been shown and described preferred embodiments of the present invention, it is not intended that the invention be limited solely to these embodiments. It is therefore to be understood that because various other embodiments may be devised by those skilled in the art without departing from the spirit and scope of the invention, it is the intention of the inventor to be limited only by the claims appended hereto.

What is claimed is:

1. An adapter for selectively providing an incoming audio signal to either a sound transducer or to a signal decoder and a display in response to a first or second information type, respectively, the incoming audio signal containing the first and second information types and being generated by an audio source and communicated to the adapter, and displaying the second information type in synchronization with the first information type, the first information type containing audio information, the second information type containing data related to the audio information, the adapter comprising:

means for determining whether the first or second information type is contained in the audio signals communicated to the adapter;

means for processing the second information type to generate first display information representative of the second information type;

sound transducer means for generating sound representative of the first information type;

switching means for electrically connecting the incoming audio signal to either the sound transducer in response to the first information type or to the processing means in response to the second information type;

means for generating from the first display information second display information in synchronization with the first information type; and a display for displaying the second display information.

2. The adapter of claim 1 wherein the audio source is a magnetic tape player.

3. The adapter of claim 1 wherein the sound transducer is speakers or headphones.

4. The adapter of claim 1 wherein the first information type is music and the second information type is lyrics to the music.

5. The adapter of claim 1 wherein the first information type is spoken words in a first language and the second information type is a translation of the spoken words in a second language.

6. An adapter for playing audio and displaying text related to the audio in synchronization with the audio, the adapter being adaptable so that the adapter unalterably communicates audio information on left and right channels from an audio source with two channels to a sound transducer, in response to a first user selected command, and so that the adapter selectively provides the audio to the sound transducer or provides the text to a display, in response to a first and second data type on a magnetic tape respectively, the first data type being audio signals containing audio information and the second data type containing information related to the audio information, in response to the second user selected command, the adapter comprising:

input means for receiving audio information and the first and second data types from an audio source;

means for identifying the first and second data types;

means for processing the second data type to generate display information representative of the second data type;

a plurality of sound transducers for generating sound representative of the first data type or the audio information;

means for providing the audio information to the plurality of sound transducers in response to the first user selected command;

means for electrically providing the first data type connecting the cassette tape player to either the processing means in response to the second data type or the sound transducers in response to the first data type, in response to the second user selected command; and means for displaying the display information representative of the second data type.

7. A method for displaying text information contained in a first signal type of incoming audio signals from a sound transducer comprising the steps of:

monitoring the incoming audio signals from a sound transducer;

detecting the first signal type containing text information in the incoming audio signals from the sound transducer;

converting the text information into a second signal type;

calculating the time to display portions of the second signal;

displaying portions of the second signal containing the text information at the calculated time;

calculating the time to highlight portions of the displayed portions of the second signal; and highlighting portions of the displayed portions of the second signal at the calculated time for the highlighting.

8. An adaptor for displaying text information contained in a first signal type of incoming audio signals from a sound transducer, wherein timing information for displaying portions of the text data is also contained in the first signal type, the adaptor comprising:

means for monitoring the incoming audio signals from the sound transducer;

means for detecting the first signal type containing text information and timing information;

means for converting the text information into display information;

means for displaying the display information;

means for calculating the time to display portions of the text information based on the timing information;

means for controlling the display of portions of the display information on the display means responsive to the calculating means;

means for calculating the time to highlight portions of the displayed portions of the second signal; and means for highlighting portions of the displayed portions of the second signal at the calculated time for the highlight.

9. The adaptor of claim 8 where the monitoring means is a microphone.

10. The adaptor of claim 9 where the display means is a liquid crystal display.

11. A method for displaying text information stored as a first audio signal on a first plurality of tracks on a compact disk in a timed relationship with a second audio signal, the second audio signal being stored on a second plurality of tracks on a compact disk, the text information having text data and timing information for the time to display portions of the text data, the method comprising the steps of:

playing on a compact disk player at least one of the first plurality of tracks of the compact disk to generate the first audio signal;

detecting the first audio signal from the at least one of the first plurality of tracks;

storing the text information from the detected first audio signals in a memory;

playing on a compact disk player at least one of the second plurality of tracks on the compact disk to generate the second audio signal;

detecting the second audio signal from the at least one of the second plurality of tracks;

providing the second audio signal from the at least one of the second plurality of tracks to a sound transducer;

reading the text data and timing information from the memory;

calculating from the timing information the time to display portions of the text data; and displaying portions of the text data in accordance with the calculated time to display the portions.

12. The method of 11 including the step of transmitting from a remote control device the play commands to the compact disk payer.

13. An adapter for an audio source that has an output circuit with an impedance of less than about 5000 ohms, the adapter comprising:

an input circuit for receiving an input signal that includes an audio signal and a text signal, the impedance of the input circuit matching the output circuit impedance of the audio source;

a visual display;

means responsive to the text retrieved signal for generating a digital driving signal for the visual display;

means for temporarily storing he text signal means for retrieving the text signal from the storing means in time relationship to the audio signal;

means for coupling the driving signal to the display to produce characters representing the text signal;

an audio output circuit; and means for routing the audio signal to the audio output circuit so the audio signal sychronized to the characters produced by the display.

14. The adapter of claim 13, in which the output circuit is the audio source is a headphone output jack and the impedance of the adapter input circuit is about 1000 ohms.

15. The adapter of claim 13, in which the output circuit of the audio source is a line output jack and the impedance of the adapter input circuit is between 1000 and 5000 ohms.

16. The adapter of claim 13, in which the output circuit of the audio source is a speaker output jack and the impedance of the adapter input circuit is 4 to 8 ohms.

17. The adapter of claim 13, in which the generating means generates a digital driving signal.

18. The adapter of claim 13, in which the input circuit receives a stereo input signal.

19. The adapter of claim 13, in which the frequency response of the input impedance is in the audio frequency band.

20. A method for displaying text with an audio program comprising the steps of:

applying to an audio source for playing sound signals an audio program and a coded text signal in the audio frequency band, the audio source having an output circuit adapted to drive a sound transducer with the played sound signals;

operating the audio source to reproduce at the output circuit the audio program and the coded text signal;

reproducing the audio program;

reading the text signal from the output circuit;

decoding the read text signal to produce a display driving signal; and coupling the display driving signal to a visual display to produce characters representing the text signal.

21. The method of claim 20, in which the audio source plays sound signals recorded on a storage medium and the applying step comprises loading into the audio source a storage medium on which an audio program and a coded text signal in the audio frequency band are recorded and operating the audio source to reproduce at the output circuit the audio program and the coded text signal stored on the medium.

22. The method of claim 21, in which the audio source is a cassette tape player and the loading step comprises loading a cassette tape cartridge in the tape player.

23. The method of claim 21, in which the audio source is a compact disk player and the loading step comprises loading a compact disk in the compact disk player.

24. The method of claim 20, in which the audio source is a radio receiver and the applying step comprises broadcasting to the radio receiver a radio signal on which an audio program and a coded text signal in the audio frequency band are modulated and operating the radio receiver to reproduce at the output circuit the audio program and the coded text signal broadcast to the radio receiver.

25. The method of claim 20, in which the output circuit of the audio source has an output impedance with a frequency response in the audio frequency band.

26. The method of claim 20, in which the coupling step produces the characters representing the text signal in timed relationship to the audio program.

27. The method of claim 26, in which the applying step and/or the operating step reproduce the audio program and the coded text signal at the output circuit out of synchronism, the method additionally comprising the step of delaying the coupling to the display driving signal to the display to synchronize the-produced characters to the audio program.

28. A text display adapter for a stereo audio source that has first and second stereo audio output channels, the adapter comprising:

a first input circuit adapted to be connected to the first output channel of the source and alternatively to receive therefrom an encoded text signal or an audio signal representing one stereo channel;

a second input circuit adapted to be connected to the second output channel of the source and to receive therefrom an audio signal representing another stereo channel;

first and second stereo audio output terminals;

a mode switch having first and second states;

a visual display device;

means in the first state of the mode switch for generating a driving signal for the visual display device responsive to the encoded text signal;

means for coupling the driving signal to the display device to produce characters representing the text signal;

means in the second state of the mode switch for coupling the audio signal representing the one stereo channel to the first output terminal; and means for coupling the audio signal representing the other stereo channel to the second output terminal.

29. The adapter of claim 28, additionally comprising a sound transducer connected to the second output terminal.

30. The adapter of claim 28, in which the mode switch is manually switchable between the first and second states.

31. The adapter of claim 28, in which the first input circuit is also adapted to receive a switch operating signal between the encoded text signal and the audio signal representative of the one stereo channel, the adapter additionally comprising means for changing the state of the mode switch responsive to the switch operating signal.

32. The adapter of claim 28, in which the first and second input circuits comprise the contacts of a stereo headphone jack.

33. The adapter of claim 28, additionally comprising means for sensing a synchronizing signal at one of the input circuits, the driving means generating a driving signal that displays the text signal in predetermined lines that are timed by the synchronizing signal so as to appear with an appropriate portion of the audio signal.

34. The adapter of claim 33, additionally comprising means timed by the synchronizing signal for highlighting words of the text signal as the appropriate portion of the audio signal is played.

35. The adapter of claim 34, in which the source is a tape player, the adapter additionally comprising means for sensing variations in the tape transport speed of the tape player and means for adjusting the timing of the synchronizing signal to correct for speed variations.

36. The adapter of claim 33, in which the source is a tape player, the adapter additionally comprising means for sensing variations n the tape transport speed of the tape player and means for adjusting the timing of the synchronizing signal to correct for speed variations.

37. A text display adapter for a stereo audio source that has first and second stereo audio output channels, the adapter comprising:

a first input circuit adapted to be connected to the first output channel of the source and alternatively to receive therefrom an encoded text signal or an audio signal representing one stereo channel;

a second input circuit adapted to be connected to the second output channel of the source and alternatively to receive therefrom an encoded text signal or an audio signal representing another stereo channel;

first and second stereo audio output terminals;

a mode switch having first and second states;

a visual display device;

means in the first state of the mode switch for generating a driving signal for the visual display device responsive to the encoded text signals received by the first and second input circuits;

means for coupling the driving signal to the display device to produce characters representing the text signal; and means in the second state of the mode switch for coupling the audio signal representing the one stereo channel to the first output terminal and the audio signal representing the other stereo channel to the second output terminal.

* * * * *

UNITED STATES PATENT AND TRADEMARK OFFICE
CERTIFICATE OF CORRECTION

PATENT NO. : 5,465,240  
DATED : November 7, 1995  
INVENTOR(S) : Roy J. Mankovitz Page 1 of 2

It is certified that error appears in the above-indentified patent and that said Letters Patent is hereby corrected as shown below:

```
On the Title page, Abstract, line 12, before "displayed"
          insert -- be --.
Column 4,  line 27, change "section" to -- selection --.
Column 6,  line 44, change "KHz" to -- kHz --.
Column 10, line 43, change "FIG. 3;" to -- FIG. 3. --.
Column 10, line 44, change "FIG. 3-4" to -- FIGS. 3-4 --.
Column 10, line 44, change "FIG. 1-2" to -- FIGS. 1-2 --.
Column 13, lines 55, 56, delete the following sentence
          "The end of each word is denoted by a vertical
          bar (^)" and insert therefor
          -- The end of each phrase is denoted by a caret
          (^), while the end of each word is denoted by a
          vertical line (|) --.
Column 14, line 6, change "|1122lamb@" to
          -- |1122|lamb@ --.
Column 14, line 7, change "|1301white|" to
          -- |1301|white| --.
Column 14, line 16, change "FIGS, 4-5" to
          -- FIGS. 4-5 --.
Column 18, line 29, change "RAM52" to -- RAM 52 --.
Column 20, line 23, change "from each-end" to
          -- from each end --.
Column 21, line 9, change "RAM52" to -- RAM 52 --.
Column 24, line 40, change "RAM52" to -- RAM 52 --.
Column 25, line 14, change "(Step 581)(FIG. 19"
          -- (Step 581).  (FIG. 19 --.
Column 25, line 35, change "RAM52" to -- RAM 52 --.
Column 26, lines 19, 20, change "the artist or disk number"
          to -- the artist, or disk number, the user --.
```

UNITED STATES PATENT AND TRADEMARK OFFICE
CERTIFICATE OF CORRECTION

PATENT NO. : 5,465,240
DATED : November 7, 1995
INVENTOR(S) : Roy J. Mankovitz

It is certified that error appears in the above-indentified patent and that said Letters Patent is hereby corrected as shown below:

```
Column 27, line 56, change "RAM52" to -- RAM 52 --.
Column 29, line 41, change "deencryptingo" to
          -- deencrypting. --.
Column 31, line 66, before "11" insert -- claim --.
Column 32, line 12, change "he text signal" to
          -- the text signal; --.
Column 32, line 22, change "circuit is" to
          -- circuit of --.
Column 33, line 19, change "the-produced" to
          -- the produced --.
Column 34, line 23, change "n the tape" to
          -- in the tape --.
```

Signed and Sealed this

Eighteenth Day of June, 1996

*Attest:*

BRUCE LEHMAN

*Attesting Officer*     Commissioner of Patents and Trademarks